US012753939B2

(12) United States Patent
Egli et al.

(10) Patent No.: US 12,753,939 B2
(45) Date of Patent: Oct. 6, 2026

(54) AUTOMATED TECHNIQUES FOR HVAC SYSTEM COMMISSIONING

(71) Applicant: Belimo Holding AG, Hinwil (CH)

(72) Inventors: Alexander Egli, Adetswil (CH); Michael Hediger, Jona (CH); Benedikt Ostermaier, Uster (CH); Jan-Hinrich Hauer, Mataró (ES)

(73) Assignee: Belimo Holding AG, Hinwil (CH)

(*) Notice: Subject to any disclaimer, the term of this patent is extended or adjusted under 35 U.S.C. 154(b) by 0 days.

(21) Appl. No.: 18/838,249

(22) PCT Filed: Feb. 17, 2023

(86) PCT No.: PCT/EP2023/054039
§ 371 (c)(1),
(2) Date: Aug. 14, 2024

(87) PCT Pub. No.: WO2023/156598
PCT Pub. Date: Aug. 24, 2023

(65) Prior Publication Data

US 2025/0146691 A1 May 8, 2025

(30) Foreign Application Priority Data

Feb. 17, 2022 (CH) ................................ 000156/2022

(51) Int. Cl.
*F24F 11/49* (2018.01)
*H04W 4/02* (2018.01)

(52) U.S. Cl.
CPC ............. *F24F 11/49* (2018.01); *H04W 4/023* (2013.01); *F24F 2221/32* (2013.01)

(58) Field of Classification Search
None
See application file for complete search history.

(56) References Cited

U.S. PATENT DOCUMENTS

| | | | | |
|---|---|---|---|---|
| 7,378,980 | B2 | 5/2008 | McFarland | |
| 7,382,271 | B2 | 6/2008 | McFarland | |
| 2006/0074494 | A1* | 4/2006 | McFarland ............. | H04W 4/33 700/1 |
| 2009/0066473 | A1 | 3/2009 | Simons | |
| 2016/0327293 | A1 | 11/2016 | Grabowski et al. | |
| 2018/0066863 | A1* | 3/2018 | Hatch ..................... | H04W 4/02 |

OTHER PUBLICATIONS

International Search Report dated May 7, 2023 issued in PCT/EP2023/054039.
Written Opinion dated May 7, 2023 issued in PCT/EP2023/054039.

* cited by examiner

*Primary Examiner* — Thomas S McCormack
(74) *Attorney, Agent, or Firm* — Blank Rome LLP

(57) ABSTRACT

A system and method of detecting positions of HVAC automation devices of an HVAC system with respect to an HVAC information plan representing the HVAC system are described. For each HVAC automation device, separation distances between the respective HVAC automation device and multiple other HVAC automation devices and/or a mobile device are measured using antenna transmission and reception distance measuring. Separation distance data is generated. For each HVAC automation device, a position in the HVAC information plan is identified based on the separation distance data.

29 Claims, 12 Drawing Sheets

AUTOMATED TECHNIQUES FOR HVAC SYSTEM COMMISSIONING

CROSS-REFERENCE TO RELATED APPLICATIONS

This application is a National Stage of International Patent Application No. PCT/EP2023/054039, filed Feb. 17, 2023, which claims the benefit of Switzerland Patent App. No. 000156/2022, filed Feb. 17, 2022, the disclosures of which are hereby incorporated by reference herein in their entireties.

FIELD OF THE INVENTION

The present invention relates to the field of HVAC systems, and in particular to techniques for assisting commissioning an HVAC system. In one non-limiting aspect, the invention relates to an automated technique for detecting respective positions of HVAC automation devices with respect to an HVAC information plan.

BACKGROUND TO THE INVENTION

Once an HVAC system is installed in a building, and before the HVAC system can become operational, the system must be commissioned into working condition. Commissioning is a complicated but necessary step to marry each physical automation device (e.g. valves, actuators, sensors and controllers) of the HVAC system with an HVAC information plan, so that each automation device can be registered and configured to operate as intended. Commissioning can also be complicated by the fact that certain automation devices may be assemblies of operating modules from different manufacturers. For example, a valve may comprise a flow-control unit with a movable valve member, assembled with an actuator unit from a different manufacturer, and requiring appropriate programming to operate correctly. Programming may include parameters specific to the HVAC system, and parameters specific to the flow-control unit and/or actuator unit.

Conventional commissioning is performed by a technical expert who manually locates each physical automation device, and identifies the device by accessing it and with respect to the HVAC information plan. Such a process is labour intensive, slow, and subject to human errors. The cost of commissioning adds significantly to the cost of installing an HVAC system, and is time critical.

Proposals have been made to make commissioning more efficient by automated position detection. The detection is based on distance measurements made electronically, using wireless or acoustic distance measurement techniques, between HVAC automation devices and fixed reference devices, referred to herein as landmark devices. These distances are used to triangulate the position of each automation device, relative to the landmark devices. Such techniques are described, for example, in U.S. Pat. Nos. 7,378,980 and 7,382,271, and in US-A-2009/066473.

While such techniques may reduce the commissioning burden compared to an entirely manual method, they still involve significant overhead and inconveniences. The fixed landmark devices have to be disposed in specific predetermined positions, which may not be easily accessible, and need themselves to undergo commissioning to be able to act as triangulation landmarks. Triangulation accuracy is very dependent on whether the fixed landmark devices are correctly placed with respect to the HVAC information plan. Also, since distance measurement accuracy may be reduced over longer measurement distances, and some automation devices may be arranged in close proximity with one another, numerous landmark devices will be required in order to achieve accurate triangulation throughout the HVAC system. The need to provide fixed landmark devices reduces design flexibility and design freedom for the HVAC system, and increases the costs compared to a system without fixed landmark devices. Moreover, fixed landmark devices used only during commissioning become redundant once commissioning has been completed.

SUMMARY OF THE INVENTION

It would be desirable to address one or more of the above issues. In one aspect, it would be desirable to reduce excess overhead in automated commissioning of an HVAC system.

Broadly speaking, a first aspect of the invention provides an automated method of detecting respective positions of automation devices of an HVAC system with respect to an HVAC information plan representing at least partially the HVAC system. The method comprises one or more of the following steps:

(a) determining, for each automation device, separation distances between the respective device and multiple other automation devices of the HVAC system, using antenna transmission and reception distance measuring, and generating separation distance data; and (b) identifying, for each device, a respective position in the HVAC information plan, based on the separation distance data, and optionally on auxiliary data associated with the respective device.

By using separation distances between multiple other HVAC automation devices, it can become possible to identify the position of a respective HVAC automation device with less reliance on fixed landmarks. Optionally the step of identifying is performed without relying on, or independently of, any landmark devices. However, some features of the invention do not exclude landmark devices, if desired.

It has surprisingly been found that even though only the relative positions of the automation devices among each other and the expected positions of the automation devices in the HVAC information plan are known, the automation devices can be allocated in the HVAC information plan using the separation distance data alone.

Also by using separation distances between multiple other HVAC automation devices, the method can be sufficiently robust to identify the position of a respective HVAC automation device even if the separation distance data is incomplete, for example, if one or more distances measurements are missing or inaccurate. The measurement distance data can collectively provide sufficient information to compensate for missing information. This can provide further advantages in practice, compared to prior art techniques relying on specific distance measurements with respect to specific landmark devices.

As used herein, the term “HVAC automation device” is intended to include any device that is in data communication with other devices or controllers, and forms an operative part of an HVAC system, or control of an HVAC system, or communication in or with the HVAC system. HVAC automation devices can include valves and dampers (for example, electronically controlled valves and dampers), actuators (for example, valve and damper actuators), sensors (for example, temperature sensors), controllers (for example, manual input devices for setting target temperatures, and device controllers for controlling operation of one or more devices of the HVAC system), communications interfaces (for example, communication base-stations and communication gateways), and optionally mobile devices used, for example, as temporary automation devices.

Also as used herein, the term "HVAC information plan" is intended to cover any representation or partial representation of the HVAC system used or usable for commissioning the HVAC system. One example includes a Building Information Model (BIM) which is a type of data model enabling a system such as an HVAC system and its physical layout to be modelled with respect to a site or building plan.

Additionally or alternatively to the first aspect, a closely related second aspect of the invention provides an automated method of detecting respective positions of automation devices of an HVAC system with respect to an HVAC information plan representing at least partially the HVAC system. The method comprises one or more of the following steps:

- determining, for each automation device a separation distance between the respective device and at least one of (i) another automation device, and (ii) a mobile device; wherein the separation distance is determined using antenna transmission and reception distance measuring;
- generating separation distance data from the separation distances;
- localizing the position of the mobile device independently of the automation devices; and
- identifying, for each automation device, a respective position in the HVAC information plan, based on the separation distance data and the localized position of the mobile device.

By using a mobile device with position localization independent of the automation devices, additional position information can be provided to assist in identification of a respective automation device, with less reliance on fixed landmarks. Optionally the step of identifying is performed without relying on, or independently of, any landmark devices. However, some features of the invention do not exclude landmark devices, if desired.

A mobile device can support the detection of respective positions of the automation devices by determining a separation distance between the mobile device and each automation device or only a selection of automation devices. For example, only the separation distances between the mobile device and communications interfaces, but not between the mobile device and other automation devices, is determined. The remaining automation devices are localized by determining the separation distance between each other and between the remaining automation devices and the communications interfaces. The use of the mobile device can increase the localization accuracy of the automation devices. At the same time, a user does not need to connect to all automation devices using the mobile device, but only to a certain number of automation devices, which makes detecting the respective positions of the automation devices much easier. This also reduces the likelihood of individual automation devices being forgotten during the identification of the respective positions of the automation devices in the HVAC information plan.

The present invention can support the individual device commissioning, wherein a user connects a handheld mobile device with individual automation devices to exchange data for the commissioning between the handheld mobile device and the automation device. The connection is automatically generated when the handheld mobile device and the automation device are within a certain range (e.g. 3 m), for example; or when the devices are arranged in a certain angle with respect to each other. If more than just one automation device is within connection distance or at a specific angle with respect to the handheld mobile device, a list of automation devices is presented to the user.

The present invention can also support the individual device commissioning within a mesh network, wherein a user receives a map view of all automation devices with or without being presented the HVAC information plan, when connecting to one automation device using, e.g., a handheld mobile device. Optionally, the data needed for the commissioning of individual devices are thereby stored in a building information modelling (BIM) database. This renders manual entry of the commissioning parameters redundant. In one scenario, the absolute X, Y and Z coordinates of each automation device are not known with respect to the HVAC information plan. In another scenario, the absolute X, Y and Z coordinates of each automation device are known with respect to the HVAC information plan.

The present invention can also support the minimal effort commissioning of automation devices, wherein the position of each automation device is automatically or semi-automatically allocated with respect to the HVAC information plan. In a first solution to accomplish this is, a BIM database receives the absolute X, Y and Z coordinates of each automation device with respect to the HVAC information plan. The absolute coordinates can be determined using a handheld mobile device, for example. In a second solution to accomplish this, only the relative X, Y and Z coordinates of the automation devices are known, but by using an algorithm to assign the absolute position of the automation devices in a fully automated way.

In some embodiments of either aspect, the step of determining separation distances comprises using antenna communication between the respective automation device, and each of the multiple other automation devices. The communication may be point-to-point communication, for example, two-way point-to-point communication. The separation distance may be determined using a ranging calculation.

Additionally or alternatively, in some embodiments, the step of determining separation distances comprises using ultra-wideband (UWB) transmission and reception. Additionally or alternatively, the step of determining separation distance comprises measuring time-of-flight (for example, return-trip or two-way time of flight). Additionally or alternatively, the transmission and reception is non-carrier-wave based. For example, the transmission and reception may be impulse-based. For example, the transmission and reception is based on pulses having a width of not more than 2 ns. Additionally or alternatively, the step of transmitting and receiving comprises using a pulse-binary-shift-keying (PBSK) protocol and/or a pulse-binary-frequency-shift-keying (PBFSK) protocol. Additionally or alternatively, the transmission and reception may occupy a bandwidth of at least 500 MHz. Additionally or alternatively, the step of determining separation distances comprises using Bluetooth® (BT) transmission and reception. Additionally or alternatively, the transmission and reception is made in the 2.4 GHz spectrum. Additionally or alternatively, the transmission and reception uses a frequency-hopping spread spectrum protocol.

A closely related third aspect of the invention, optionally in combination with the first and/or second aspect above, provides an automated method of operation of a data processing system to detect respective positions of automation devices (12) of an HVAC system (10) with respect to an HVAC information plan (48) representing at least partially the HVAC system, comprising:

(a) receiving from the automation devices, separation distance data (62) representing, for each automation device, separation distances between the respective device and multiple other automation devices of the HVAC system, the separation distance data derived from antenna transmission and reception distance measuring; and (b) identifying (80, 90), for each device, a respective position in the HVAC information plan, based on the separation distance data, optionally independently of any landmark devices.

In any aspect, the step of identifying may comprise using a pattern fitting algorithm to process a pattern derived from the separation distance data. As used herein, the term "pattern fitting" means adapting the pattern to fit to a target, based on the arrangement or layout in the pattern. Pattern fitting may include pattern matching and/or pattern recognition. Pattern fitting may enable accurate determination of positions even without direct triangulation from fixed landmark devices, and/or without landmark matching.

In some embodiments, the identification step comprises the sub-steps of:

(i) generating from the separation distance data an intermediate data model representing a disposition of the automation devices relative to one another, according to the multiple distance measurements, and (ii) fitting the intermediate data model to at least a portion of the HVAC information plan using a pattern fitting algorithm.

With the above, the method can be performed in computationally efficient steps. By generating an intermediate data model, the relative dispositions of the automation devices can be determined without needing to identify individual automation devices with respect to the HVAC information plan. For example, the intermediate data model can represent a disposition in coordinate space compatible with the HVAC information plan. This can facilitate fitting the intermediate data model to (at least a portion of) the HVAC information plan based on the pattern. For example, the pattern fitting algorithm can be a landmark-free pattern fitting algorithm.

In some embodiments of any aspect, the intermediate data model represents the disposition as nodes in an interconnected network, the relative lengths of interconnections between nodes being based on (e.g. corresponding to) the separation distances measured between automation devices. The nodes represent the automation devices, and the interconnections, which may be virtual, represent the separation distance measurements. In some embodiments, the interconnections have a spring-like and/or weighted position model behavior to enable the intermediate data model to accommodate inconsistencies and/or inaccuracies in the measured separation distances.

In some embodiments of any aspect, the step of fitting comprises one or more of: re-orientation of the intermediate data model with respect to co-ordinate axes; rotation of the intermediate data model with respect to a rotation axis; reflection of the intermediate data model with respect to a mirror plane; re-scaling of the intermediate data model; translation of the intermediate data model with respect to co-ordinate axes; adjustment of the separation distances to fit nodes of the intermediate data model to device locations in the HVAC information plan.

In some embodiments of any aspect, the step of identifying comprises treating an automation device relative to which a greater number of measurement distances have been made, with increased position accuracy compared to an automation device relative to which fewer distance measurements have been made. For example, such treatment may be effected by the spring-like model described above, in which a greater number of interconnections will result in less position freedom of the node. Additionally or alternatively, such treatment may be effected at adjustment of separation distances during fitting of the nodes to the HVAC information model.

In some embodiments of any aspect, the step of identifying comprises treating separation distance accuracy to be dependent on the degree to which the automation devices are in mutual line-of-sight and/or the degree to which the separation distance determinations are stable. Distance measurements can be affected by obstacles in the wireless transmission path between the automation devices, especially by wall and floor structures, or other major obstacles. The separation distance accuracy can be taken into account, for example, during fitting of the intermediate data model (if used) to device locations in the HVAC information plan.

Additionally or alternatively any to the above, in any aspect the step of identifying may optionally comprise using auxiliary information provided from a respective HVAC automation device. The step of identifying may comprise comparing the auxiliary information with corresponding information in or derivable from the HVAC information plan, to assist in identifying the automation device.

In some embodiments using the step of fitting an intermediate data model to the HVAC information plan, the step of fitting may comprise comparing the auxiliary information with corresponding information in or derivable from the HVAC information plan, to guide fitting of the intermediate data model and/or to resolve ambiguities between different possible fits.

For example, the auxiliary device information may comprise one or more of:

Type information defining the automation device type. The device type may, for example, be any one or more of an HVAC valve, an HVAC damper, an HVAC actuator (e.g. for a valve or damper), an HVAC sensor (for example, a temperature sensor or a flow sensor), an HVAC controller (for example, an input device or a device controller for controlling operation of an HVAC device), a communications interface for the HVAC system (for example, a communications gateway between antenna and wired communications paths, for example, a UWB-ethernet gateway). Where a mobile device is used, (for example, as a temporary automation device), the type information may also include a mobile device as an automation device type. In some embodiments, the device type is selected from: an HVAC actuator; an HVAC sensor; an HVAC controller; an HVAC communications interface; a mobile device.

Orientation information expressing a physical orientation of the automation device, for example, detected by an accelerometer and/or a magnetometer integrated into the automation device, or inferred indirectly from a sensor for detecting one or other physical parameters.

Azimuth information associated with one or more separation distances. Wireless transmission and reception units of the devices may, in some embodiments, include azimuth determination in addition to distance measurement. For example, azimuth may be determined using multiple antennae and/or relative phase analysis. Azimuth measurement may be less accurate than distance measurement accuracy. The present technique accommodates this by treating azimuth information as auxiliary information.

Elevation information expressing a relative elevation of the automation device. Elevation may, for example, be detected by means of a barometer integrated into the automation device. In some embodiments of any aspect, the step of identifying may comprise identifying a sub-set of automation devices that are determined to be grouped together compared to other automation devices. The sub-set may be treated at least partly independently of the other automation devices. This can facilitate identifying the automation devices. Where the step of fitting an intermediate data model is used, treating closely grouped devices as a sub-set can assist in fitting to the HVAC information plan.

In some embodiments of any aspect, a separation distance between one automation device and another (and/or a mobile device) may be determined by repeating a measurement of the same distance multiple times, and processing the multiple measurements to derive the separation distance data. For example, the multiple measurements can be processed to exclude the influence of noise or other measurement fluctuations caused, for example, by objects in the signal path between the automation devices that may affect the time of flight with fluctuating delays. One example of processing may be to average the multiple measurements. Additionally or alternatively, another example of processing may be to calculate (e.g. select) a smallest of the multiple measurements. Fluctuations caused by intervening objects generally only increase the measurement, and so smaller or a smallest of the values may be more reliable than larger or a largest value. Additionally or alternatively, another example of processing is to calculate a confidence factor representing a degree of confidence in the distance measurement. For example, the confidence factor may be derived from a calculation of a degree of variability amongst the multiple measurements. The confidence factor can provide a useful indicator of measurement consistency and/or reliability. The smaller the variability, the greater the confidence factor. The confidence factor may be expressed positively, for example, as a degree of stability, or the confidence factor may be expressed negatively, for example, as a degree of variability.

The number of automation devices represented by the intermediate data model may depend on the individual site, computational loads, and ease of fitting to the HVAC information plan.

Where a mobile device is used, the method may further comprise moving the mobile device from a first location to a second location, and repeating the method steps with the mobile device positioned at the second location.

Optionally, the method comprises the step of generating, in response to the position determination, a target location for guiding an operator to position the mobile device at the target location. Such a method can provide automated guidance for guiding positioning of the mobile device at one or more positions calculated to assist the position determination of the automation devices.

Broadly speaking, a fourth closely related aspect of the invention provides an at least partly automated method of setting up at least one HVAC automation device in an HVAC system, the method optionally using a position detection method according to the first aspect and/or second aspect, the method of setting-up comprising:

(a) operating a first data processing system to identify at least one HVAC automation device by detecting a respective position of the at least one automation device with respect to an HVAC information plan, using antenna transmission and reception distance measuring, and optionally using a method according to the first and/or second and/or third aspect described above; and (b) loading operating information into the at least one automation device, based on the identity of the automation device identified in step (a), the step of loading comprising: using antenna communication; accessing a second data processing system remote from and/or independent of the first data processing system; and obtaining at least some operating information from the second data processing system.

The HVAC information plan may optionally be stored by the first data processing system.

The term "data processing system" as used herein is intended to include any local and/or distributed processing system or apparatus including data storage. At least one data processing system (e.g. the second data processing system) may optionally be distinct from the automation devices, and/or at least one data processing system (e.g. the first data processing system), may optionally be incorporated within an automation device.

The term "operating information" as used herein is intended to cover any information loadable to an automation device to set-up operation of the automation device. Operating information includes, for example, one or more operating parameters, and/or programming and/or executable software.

At least one data processing system, for example, the second data processing system, may comprise a server accessible remotely for provisioning HVAC automation devices with operating information (e.g. operating parameters and/or suitable programming).

Such a technique can enable the automation device to be set-up without requiring all of the set-up information and/or operating parameters to be stored by the first data processing system used for detecting a respective position of an automation device with respect to the HVAC information plan, thereby reducing resource overhead at the HVAC system site.

Another aspect of the invention concerns an automated method of adapting an HVAC information plan of an HVAC system when at least one movable component of the HVAC information plan is moved affecting at least one dimension of at least one section of a building, comprising repeatedly detecting respective positions of the at least one movable component with respect to the HVAC information plan, wherein the detecting comprises:

(a) determining, for the at least one movable component, separation distances between the respective movable component and one or more other movable components and/or one or more automation devices of the HVAC system, and generating separation distance data, wherein the separation distances are determined according to any one of the previously described methods;

(b) identifying, for the at least one movable component, a current respective position in the HVAC information plan, based on the separation distance data, optionally independently of any landmark devices; and (c) updating the HVAC information plan (48) with respect to the identified current respective position.

In the context of the present invention, a movable component of the HVAC information plan is any component that has a substantial influence on the parameters to be set in an HVAC system when moved. The at least on movable component is preferably selected from the list consisting of movable walls, movable floors, movable ceilings, movable furniture, movable installations, automation devices or any combination thereof. A movable component is a component that is intended according to the HVAC information plan to possibly be displaced from an initial position. Since automation devices are also movable components of the HVAC information plan that may have a substantial influence on the parameters to be set in an HVAC system when moved, a change in location of an automation device can also trigger adapting the HVAC information plan.

In the context of the present invention, a section of a building can be a room, a hall, a hallway, an atrium, a garage, a part of a basement, a workshop or a vestibule.

Building architectures not only comprise fixed walls and ceilings, but may also comprise, for instance, movable walls to convert an office space comprising multiple sections into a conference hall comprising only one section. A movable component can be composed of several parts that can be disassembled for moving and, if necessary, storing. For example, a movable wall that divides a larger room into two smaller rooms can be disassembled into individual segments and the individual segments moved aside to create the larger room from the two smaller rooms.

The movable components are equipped with means for antenna transmission and reception allowing the communication between the respective movable component and other movable components as well as the automation devices. This enables integration of the movable components in the HVAC information plan. The technologies that can be used for antenna transmission and reception comprise Wireless Personal Area Networks (WPAN; e.g. Bluetooth® (BT) and ultra-wideband (UWB)), Wireless Local Area networks (WLAN; e.g. Wi-Fi), and Wireless Wide Area Networks (WWAN; e.g. used for mobile phone signals).

As a consequence of this aspect, whenever a movable component, e.g. a movable wall, is repositioned in a building, the repositioning is detected by the system and the automation devices can be reassigned to a new configuration of the HVAC information plan. Additionally, changes in the parameters of the HVAC system can be made automatically to accommodate the new configuration.

In a preferred embodiment, the updating of the HVAC information plan in the method of adapting an HVAC information plan of an HVAC system comprises the steps of:

(a) checking whether a previous respective position for the at least one movable component exists;
(b) if a previous respective position for the at least one movable component exists, receiving the previous respective position;
(c) determining a spatial distance between the current respective position and the previous respective position of the at least one movable component; and
(d) in response to the spatial distance exceeding a predefined threshold, updating the HVAC information plan (48) with respect to the determined spatial distance.

In another preferred embodiment, the updating of the HVAC information plan in the method of adapting an HVAC information plan of an HVAC system comprises the steps of:

(a) checking whether a previous respective position for the at least one movable component exists;
(b) if the previous respective position for the at least one movable component does not exist, updating the HVAC information plan with respect to the current respective position.

A further aspect of the invention concerns an automated method of configuring a new automation device of a particular type in a commissioned HVAC system, comprising the steps of:

(a) receiving configuration parameters of at least one decommissioned automation device from an HVAC information plan, wherein the configuration parameters comprise the type of the at least one decommissioned automation device and the respective position(s) of the at least one decommissioned automation device;
(b) detecting a respective position of the new automation device with respect to the HVAC information plan, wherein the respective position is detected according to any one of the previously described methods;
(c) determining a spatial distance between the new automation device and the at least one decommissioned automation device comprising the same type as the new automation device;
(d) identifying the one decommissioned automation device with the smallest spatial distance to the new automation device; and
(e) if the spatial distance between the new automation device and the decommissioned automation device identified in the previous step is below a predefined threshold, transferring the configuration parameters from the decommissioned automation device identified in the previous step to the new automation device, and, optionally, removing the configuration parameters of the decommissioned automation device identified in the previous step from the HVAC information plan.

In the context of the present invention, a new automation device is an automation device that is not yet part of the system in the sense that it has not yet been commissioned and its respective position with respect to the HVAC information plan has not yet been detected.

In the context of the invention, the process of configuring a new automation device corresponds to the commissioning of the new automation device in the HVAC system.

Prior to receiving the configuration parameters, the configuration parameters are stored in at least one automation device of the HVAC system, for example in a communication interface.

In the context of the present invention, a decommissioned automation device is an automation device that used to be but is no longer part of the HVAC system, for example, due to being outdated or defective. The configuration parameters of the at least one decommissioned automation device are stored as a digital copy of the decommissioned automation device in the HVAC system, so that they can be transferred to the new automation device that replaces the decommissioned automation device. The serial number, device type, absolute installation coordinates, relative installation coordinates and other data pertaining the decommissioned automation device can thus be transferred to the new automation device. The device configuration is preferably automatic, semi-automatic or manual. A decommissioned automation device does not necessarily have to be taken out of use completely. The decommissioned automation device can, for example, be used again elsewhere and commissioned again there.

In a preferred embodiment, the method of configuring a new automation device of a particular type in a commissioned HVAC system comprises an additional step of updating the HVAC information plan with respect to the transferred configuration parameters to the new automation device.

In a closely related fifth aspect, the invention provides apparatus for an HVAC system, the apparatus comprising:

a plurality of HVAC automation devices, each automation device selected from the group comprising: actuators, sensors, controllers, communications interfaces and mobile devices; each automation device comprising a communications unit for antenna communication with other automation devices; and a data processing unit operable to communicate directly or indirectly with the plurality of HVAC automation devices, and configured to detect respective positions of the automation devices with respect to an HVAC information plan representing at least partially the HVAC system, wherein the apparatus is configured to:

(a) determine, for each automation device, separation distances between the respective device and multiple others of the automation devices, using antenna transmission and reception distance measuring, and generating separation distance data; and (b) identify, for each automation device, a respective position in the HVAC information model, based on the separation distance data, optionally independently of any landmark devices.

Additionally or alternatively to the fifth aspect, a closely related sixth aspect of the invention provides apparatus for an HVAC system, the apparatus comprising:

a plurality of HVAC automation devices, each automation device selected from the group comprising: actuators, sensors, controllers and communications interfaces; each automation device comprising a communications unit for antenna communication with other automation devices;

a mobile device comprising (i) a communications unit for antenna communication with one or more automation devices, and (ii) a localization unit for localizing a position of the mobile device independently of the automation devices;

a data processing unit operable to communicate directly or indirectly with the plurality of HVAC automation devices and the mobile device, and configured to detect respective positions of the automation devices with respect to an HVAC information plan representing at least partially the HVAC system, wherein the apparatus is configured to:

determine, for each automation device, a separation distance between the respective device and at least one of (i) another of the automation devices, and/or (ii) the mobile device; wherein the separation distance is determined using antenna transmission and reception distance measuring, generating separation distance data from the separation distances;

localize the position of the mobile device independently of the automation devices; and identify, for each automation device, a respective position in the HVAC information model, based on the separation distance data, and the localized position of the mobile device.

In a closely related seventh aspect, optionally in combination with the fifth and/or sixth aspect, the invention provides apparatus for an HVAC system, the apparatus comprising:

a first data processing system configured to identify at least one HVAC automation device by detecting a respective position of the at least one automation device with respect to an HVAC information plan, using antenna transmission and reception distance measuring; and a second data processing system remote from the first data processing system, configured to store operating parameters for the at least one HVAC automation device, and responsive to the identification performed by the first data processing system to provide the operating parameters for loading to the HVAC automation device, optionally via the first data processing system.

A closely related eighth aspect of the invention, optionally in combination with the fifth and/or sixth and/or seventh aspect, provides apparatus for an HVAC system, the apparatus configured to perform a method of any of the first and/or second and/or third and/or fourth aspects above.

A closely related ninth aspect of the invention provides computer program code and/or a computer-readable medium, comprising instructions which, when executed by computer, carry out a method of any of the first and/or second and/or third and/or fourth aspects above.

Although certain features and aspects have been set out above and in the appended claims, this is merely to aid understanding certain aspects, and does not limit the scope of protection. Protection is claimed for any novel feature or idea disclosed herein and/or in the drawings whether or not emphasis has been placed thereon.

DETAILED DESCRIPTION OF PREFERRED EMBODIMENTS

Figure 1:
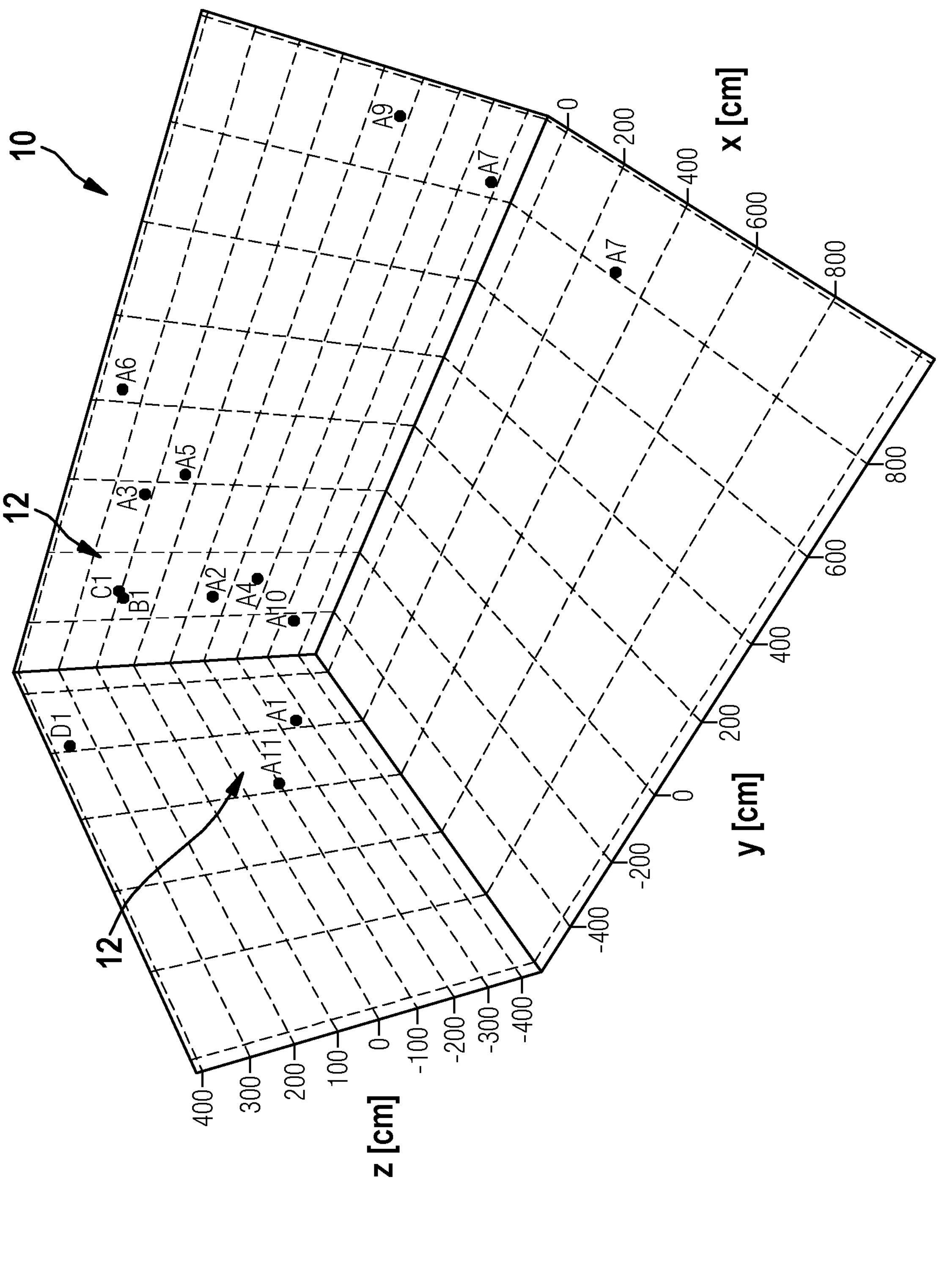
FIG. 1 is a schematic diagram illustrating a physical layout of automation devices of an HVAC system in part of a building.

Non-limiting embodiments are now described by way of example, with reference to the accompanying drawings. In the drawings, the same reference numerals are used to denote the same or corresponding features, whether or not described explicitly.

Referring to FIG. 1, at least a part of an HVAC system 10 comprises a plurality of automation devices 12, including a plurality of actuators A1-A12, at least one sensor B1, at least one controller C1, and at least one communications device D1. FIG. 1 illustrates the physical layout of the automation devices 12 in a three-dimensional space, identified by axes x, y and z. To avoid cluttering the drawing, FIG. 1 only shows the automation devices 12, and not any intermediate passive connections, such as HVAC conduits, nor any structure of the building in which the HVAC system 10 is installed.

Figure 2:
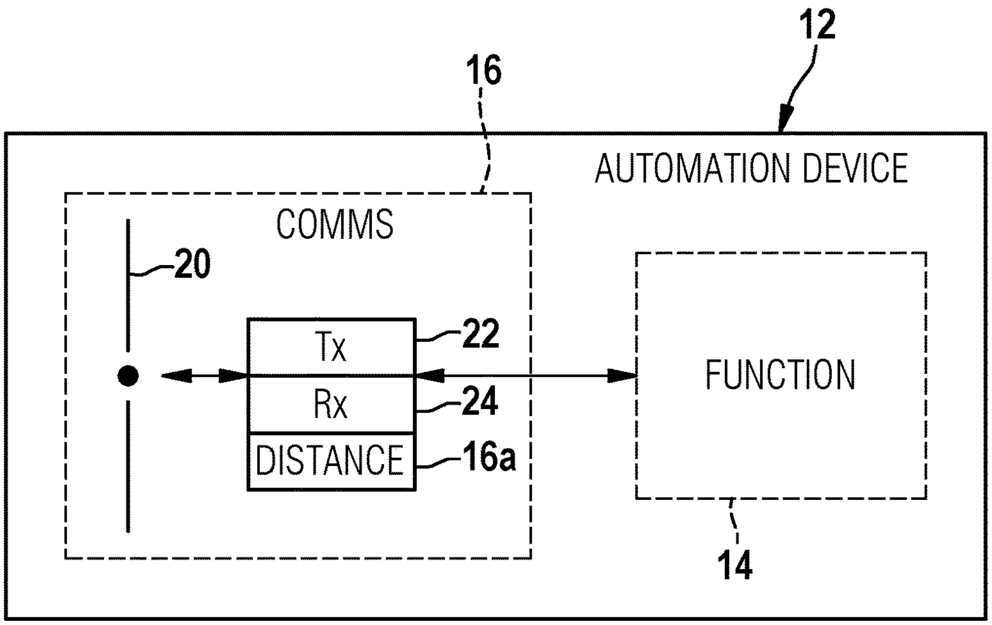
FIG. 2 is a schematic block diagram of functional parts of an automation device.

Referring to FIG. 2, each automation device 12 generally comprises electronic circuitry including a functional unit 14 for performing the operational function(s) of the automation device, and a communications unit 16. The units 14 and 16 may be distinct units, or they may at least partly be implemented together by common circuitry, for example, a data processor executing software for performing operational function(s) and communication function(s). In the case of an automation device comprising an actuator A1-A12, the operational function(s) may include a driver for the actuator, to set the actuator in a desired or commanded operational state (as described below in more detail in respect of FIG. 3). In the case of an automation device comprising a sensor B1, the operational function(s) may include receiving an input from a transducer, for example, a transducer for detecting temperature, or pressure, or flow rate, digitizing the input, optionally compared it to a threshold, and communicating the output for sending via the communications unit 16. In the case of an automation device comprising a controller C1, the operational function(s) may include receiving one or more inputs, via the communications unit 16 and/or via a manual input device (not shown), processing the inputs and generating controller outputs for transmitting to other automation devices via the communications unit 16. In the case of an automation device comprising a communications device D1, the operational function(s) may include providing a bridge or gateway between the antenna-based communications unit 16, and a different communications interface, for example, a wired communications interface, such as an ethernet port. For example, the communications device D1 may be a UWB-ethernet gateway (e.g. as in FIG. 4).

Figure 4:
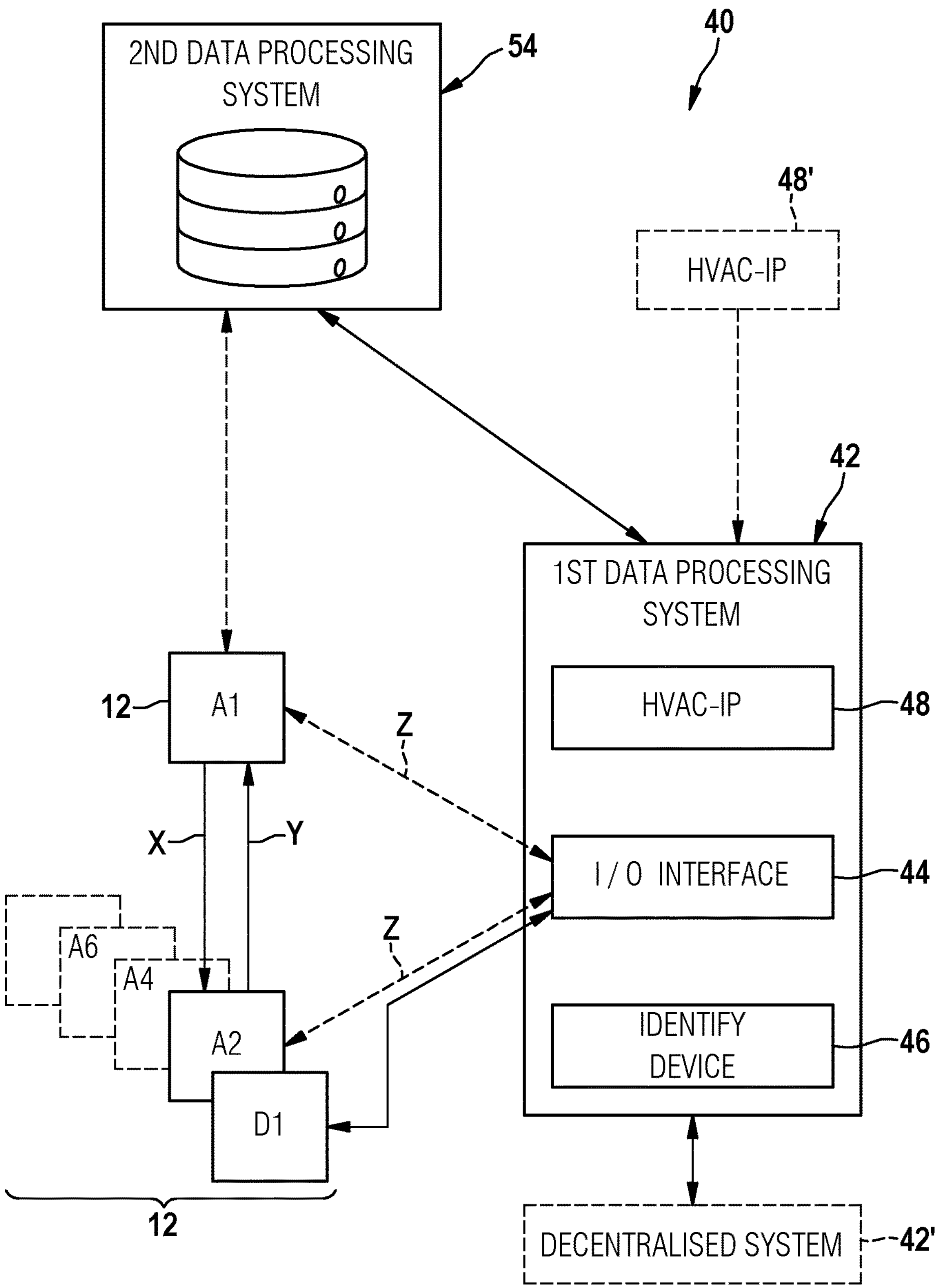
FIG. 4 is a schematic block diagram of an automated system for assisting commissioning of the HVAC system.

The communications unit 16 comprises at least an antenna 20 coupled to a transmitter 22 and a receiver 24, for antenna-based communication, also referred to herein as antenna communication. A distance determination module 16*a* is operable to determine a separation distance between the automation device 12 and other automation devices with which the automation device 12 is in antenna communication (FIG. 4). Separation distance may be determined, for example, by one or more time of flight measurements. One-way time of flight (arrow X in FIG. 4) may be measured by synchronized clocks in the distance measuring modules of two different automation devices. Alternatively, return-trip time of flight (arrows X and Y in FIG. 4) may be measured by an automation device being configured to re-transmit a received signal back to the originating automation device, enabling the originating automation device to measure the time taken for a transmitted signal to be received back. The communications unit 16 may also be operable to determine other transmission/reception related characteristics, for example, an azimuth (e.g. angle-of-arrival) of a received signal and/or a stability of the distance measurement and/or a confidence factor associated with the distance measurement. Azimuth may be detected using multiple antennas and/or phase measuring and/or beam-forming techniques. Stability may be detected by repeating the distance measurement several times. For example, the separation distance to another automation device may be determined multiple times, and the results processed to reduce statistical variations. For example, the results may be averaged, or a smallest of the distance measurements may be used on the basis that measurement errors (e.g. based on time of flight) in general are not negative. Stability may represent a degree of variability amongst the multiple measured distances to the same automation device. The stability may be affected by structures, such as floors, walls or other major objects, between automation devices 12. A confidence factor may depend at least partly on the degree of variability, the smaller the variability, the larger the confidence factor.

Although the distance measuring function or module 16*a* is illustrated as being implemented entirely within the automation device 12, in other embodiments, at least some of the functionality may be performed by other apparatus (for example, the first data processing apparatus 42 described later with respect to FIG. 4).

The communications unit 16 may be configured to operate according to an antenna communications protocol, which may be one or more of: ultra-wideband (UWB); and/or non-carrier-wave based (for example, pulse-based and/or impulse-based instead of carrier-wave based); and/or a pulse-binary-shift-keying (PBSK) protocol; and/or a pulse-binary-frequency-shift-keying (PBFSK) protocol; and/or occupying a bandwidth of at least 500 MHz; and/or Bluetooth® (BT); and/or in the 2.4 GHz spectrum; and/or a frequency-hopping spread spectrum protocol. The communications unit 16 may optionally comprise a transceiver implementing the communications protocol, for example, a UWB transceiver, and/or a BT transceiver. Distance measuring may be performed by a ranging function of the transceiver.

Figure 3:
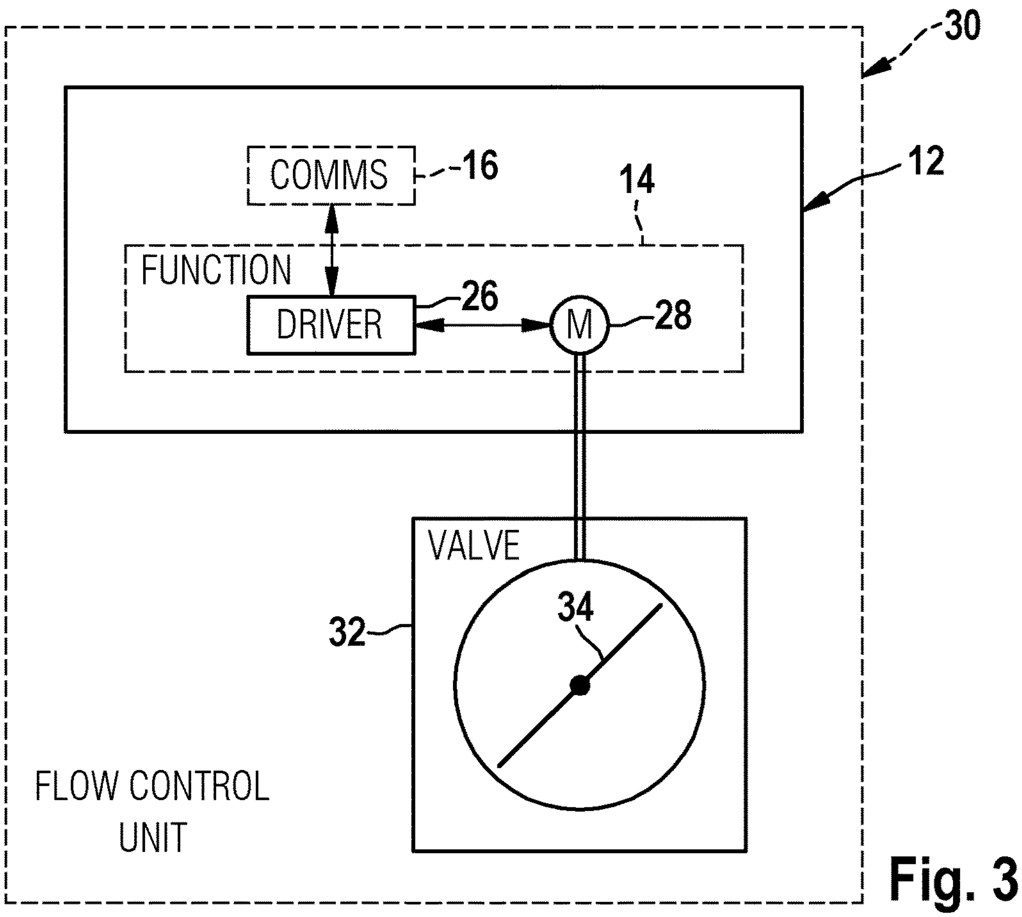
FIG. 3 is a schematic block diagram of functional parts of an actuator automation device.

Referring to FIG. 3, in the case of the automation device 12 being an actuator (A1-A12), the functional unit 14 comprises a driver 26 for driving an electro-mechanical mover 28, for example, an electric motor. The actuator may form part of a flow control unit 30 comprising a flow regulator 32 with an actuated part 34 operated by the mover 28. The flow control unit 30 may be an assembly of the actuator as one module, coupled to the flow control unit 30 as a distinct module. In the present example, each actuator is referred to as an actuator-type automation device, but in other examples, the device could be classed instead as a valve, and/or by the type of valve (for example, a butterfly valve for regulating liquid flow, or a damper valve for regulating air or gas flow).

Figure 5:
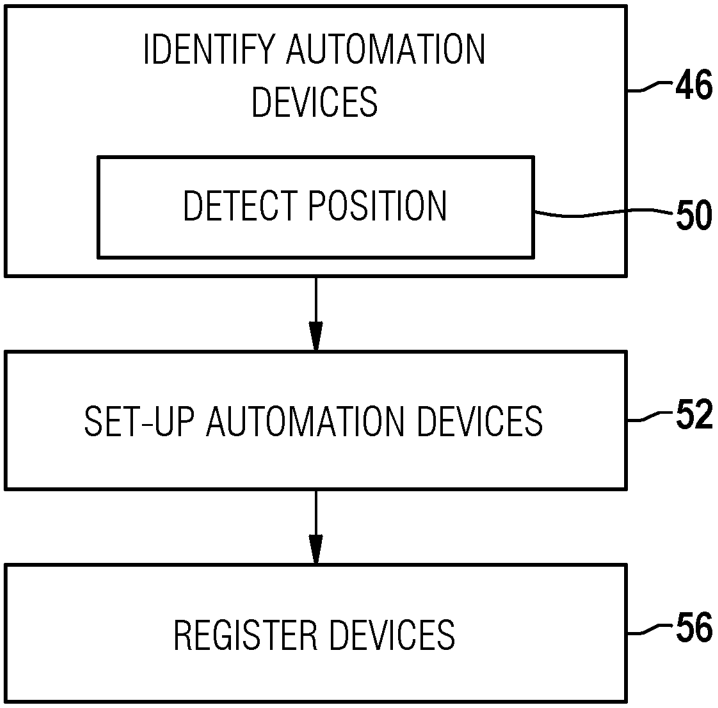
FIG. 5 is a schematic flow diagram illustrating a method of operation of the system of FIG. 4.

A system 40 illustrated in FIG. 4 facilitates automatic or semi-automatic commissioning of the HVAC system 10, in particular the automation devices 12, using a process illustrated in FIG. 5. The system 40 may execute computer program code instructions on one or more processing devices or processing systems to carry out the process of FIG. 15. The system 40 includes a first data processing system 42 including at least one input and/or output (I/O) interface 44 coupled to the communications device(s) D1, for communication with the automation devices 12 via the communications device(s) D1. Depending on the implementation and layout of the devices 12, the communications device(s) D1 may be in direct antenna communication with the other automation devices 12, or at least automation device 12 may function to relay communication messages between the communication device(s) D1 and more distant automation devices 12. In other embodiments, the I/O interface 44 may be a base station for antenna communication with the automation devices 12, as indicated by broken arrows Z (either directly or via relays between automation devices 12). A difference between a base station and a communications device D1 is that the communications device D1 forms part of the group of automation devices 12 and is included in an HVAC information plan (described below). In contrast, a base station is associated with the first data processing system 42.

Although in this embodiment the first processing system 42 is illustrated to be distinct from the automation devices 12, in other embodiments the first processing system 42 could be implemented within an automation device, for example, within the communications device D1.

The first data processing system 42 identifies (module/step 46) each automation device with respect to an HVAC information plan (HVAC-IP) 48. In the present example, the HVAC information plan 48 is a building information model (BIM). The HVAC information plan 48 may be stored within the first data processing system 42, or it may be stored in a remote system, device or server 48', accessible by the first data processing system 42.

Step 46 includes a step 50 of detecting the position of each automation device 12 with respect to the HVAC information plan 48. In the present embodiment, step 50 detects the position automatically. Based on the detected position, the identity of the respective automation device is obtained from the HVAC information plan 48. Techniques for automatic position detection are described later below. The ability to detect the position automatically thus enables commissioning without the need for significant manual intervention.

Step 52 performs downloading operations, and/or provisioning, and/or programming, to set-up each automation device 12, based on the device identity. The information for setting-up the automation device 12 includes one or more of:

1. HVAC system information, optionally any of:
1.1 a unique identifier or address that identifies the automation device in the HVAC information plan 48;
1.1 Site information, for example, one or more of: project name, site name, building name, building part, building floor, building area, zone name, building segment information.
1.3 Device identification, for example, one or more of: plant identification code, device identification code, device family type;
1.4 Device location, for example, one or more of: device installation location, device positioning information;
1.5 Device interface information, for example, identifying with which interfaces the device is authorized to communicate;
1.6 Commissioning information, for example, one or more of: commissioning status, commissioning time and date, commissioner entity identification.
1.7 Application Information, for example, one or more of: medium type, supply chain information.
1.8 Device configuration, for example, in the case of an actuator, one or more of: maximum flow, minimum flow, temperature setpoints; and/or
2. Device specific information, optionally any of:
2.1 General product information, for example, one or more of: product characteristics, device manufacturer, device name, device application, voltage power consumption, price;
2.2 Programming characteristics, for example, in the case of an actuator, characteristics associated with the flow regulator actuated by the actuator;
2.3 Key performance indicators, for example, operation hours and/or other predictive maintenance information for the automation device.

In the present embodiment, at least a portion of the downloaded information (e.g. device specific information) is downloaded from at least one second data processing system 54, optionally remote from the first data processing system 42 and/or the HVAC system 10. Such a technique avoids any need to store all of the information within the first data processing system 42 and/or the HVAC information map 48. The second data processing system 54 may, for example, be provided by the manufacturer(s) of the automation device(s) 12, to enable the automation device(s) 12 to be programmed efficiently and correctly. Each automation device 12 may communicate directly with the second data processing system 54, or indirectly, for example, via the first data processing system 42.

Step 56 completes the commissioning process by updating the HVAC information plan 48 to record the identities and/or communication addresses of the physical automation devices 12 representing in the HVAC information plan 48. The HVAC information plan 58 therefore stores information necessary to interface with the real-world automation devices 12 of the HVAC system 10.

Although in the illustrated example, the first data processing system 42 may be local to the HVAC system 10, in other embodiments, the first data processing system may be remote and/or distributed and/or decentralized with respect to the HVAC system 10, as illustrated by module(s) 42'.

Figure 6:
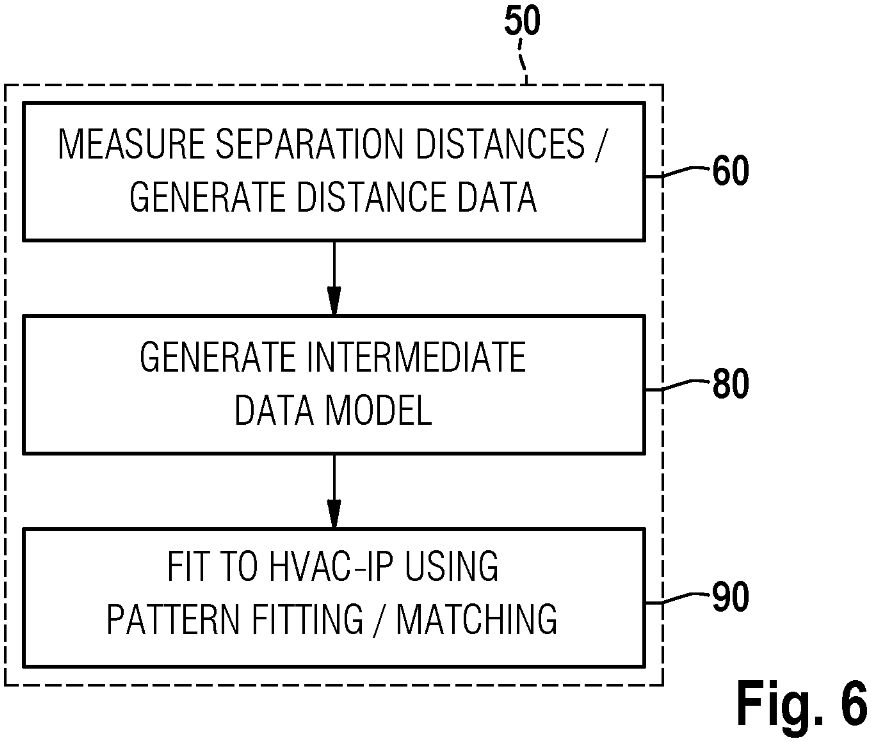
FIG. 6 is a schematic flow diagram illustrating a detail of a step of the method of FIG. 5.

Referring to FIG. 6, the step 50 of detecting the position of an automation device 12 with respect to the HVAC information plan comprises a step 60 of measuring separation distances between at least one automation device 12 (e.g. A1) and plural other automation devices (e.g. A2-A11, B1, C1, D1) with which the automation device 12 (A1) is in antenna communication. The separation distances are detected using antenna transmission and reception, e.g. ranging based on point-to-point communication, by the distance measuring module 16*a*. Each automation device 12 generates a set of separation distance data 62 (FIG. 7) representing or including at least a sub-set, optionally all, of the measurable separation distances 64 and the respective other automation devices 66 with which the separation distances are measured. Some separation distances may be missing or may be intentionally excluded, for example, if the confidence factor associated with the measurement is too low. The separation distance data 62 may further include auxiliary data which, in this example, includes azimuth data 68 associated with the distance measurement, and the confidence factor and/or stability data 70 associated with the distance measurement data 64, as described above.

The separation distance data 62 may further include device-specific auxiliary data associated with the respective automation device 12 from which the distance measurements 64 are made, for example, the type 72 of automation device (for example, selected from actuator, sensor, controller or communications device). Additionally or alternatively, the physical orientation 74 of the automation device with respect to gravity measured by a built-in accelerometer (e.g. a three-dimension accelerometer, not shown) or inferred indirectly from one or more other sensed parameters. Additionally or alternatively, a barometer may provide an indication 76 of relative elevation. Additionally or alternatively, a magnetometer may provide additional directional orientation information 74. Additionally or alternatively, a GPS receiver may provide a further positional reference. Additionally or alternatively, a signal strength detector may provide information about relative signal strength at the locality of the automation device.

Figure 7:
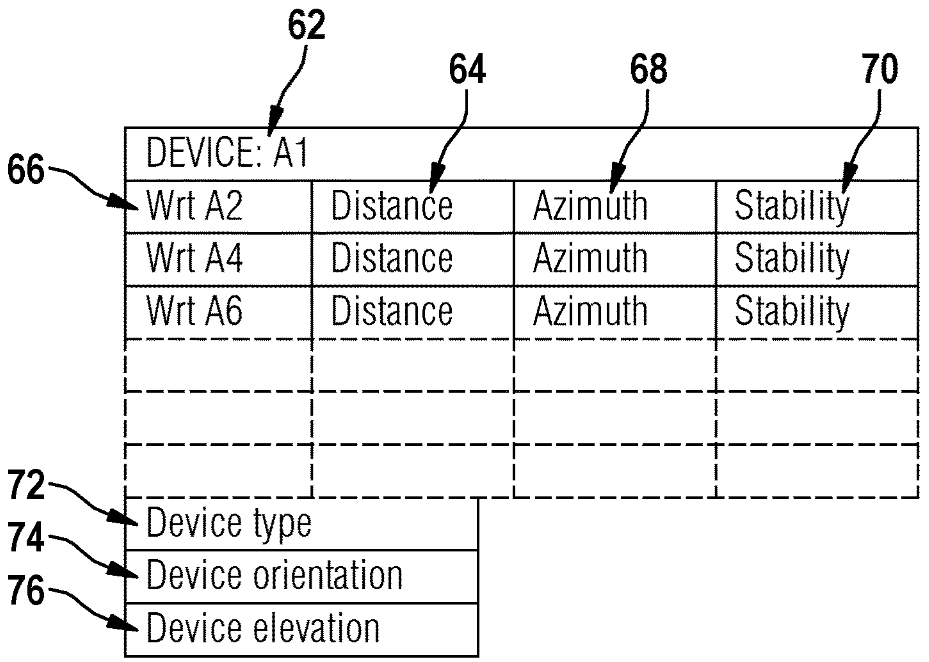
FIG. 7 is a schematic illustration of components of separation distance data.
Figure 8:
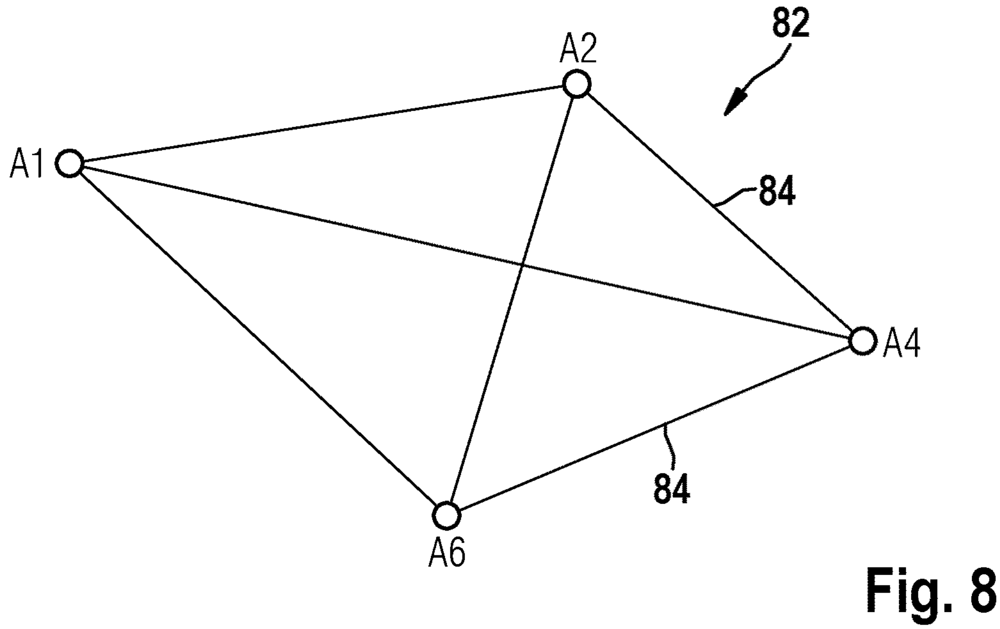
FIG. 8 is a schematic illustration of part of an intermediate data model constructed of nodes and interconnections.

Referring to FIG. 6, at step 80, an intermediate data model 82 (FIG. 8) is generated based on the separation distance data for the various automation device 12. The intermediation data model 82 represents a disposition of the automation devices relative to one another, according to the multiple distance measurements. Referring to FIG. 8, in this example, the intermediate data model 82 comprises nodes representing the automation devices 12 (e.g. A1, A2, A4, A6 from FIGS. 4 and 7), with interconnections of length, or scaled, according to the separation distances measured between the respective automation devices 12. FIG. 8 illustrates a tetrahedral disposition, with each node having respective interconnections 84, which may be virtual, to each other node for which a distance is measured. Although only four nodes, each with three interconnections, are illustrated, the number of nodes and the number of interconnections may be greater, or fewer, as appropriate. Also, multiple intermediate data models may be generated from the same separation distance data representing, for example, multiple possible dispositions of the automation devices that explain the same separation distance data. Each model may be processed in parallel or in turn by the subsequent steps described below, until a best fitting model is identified.

In this embodiment, the intermediate data model 82 includes all types of automation device 12. In other embodiments, additional or alternative intermediate data models may be generated according to the type of automation device (e.g. identified according to the type information 72 of FIG. 7).

The interconnections 84 can have spring-like and/or weighted model behaviour, to enable the intermediate data model to accommodate inaccuracies, while still being able to represent a coherent model of all automation devices 12 and separation distances. The default length of the interconnection corresponds to the measured separation distance, and the spring and/or weighting behaviour permits a degree of freedom for an interconnection to shorten or lengthen, with progressively more resistance the greater the deviation with respect to the default length. The resistance may also depend on relative weighting of the distance measurement. One example algorithm that is computationally efficient and incorporates suitable model behaviour is a so-called NEATO algorithm. Additionally to the above, the model can be further adapted by giving greater weight to positional accuracy of a node that has more interconnections and/or greater weight and/or spring resistance to interconnections that are relatively more stable and/or have a high confidence factor. Alternatively, distance measurements that do not meet a certain level of stability or degree of confidence can be screened out and not used in the intermediate data model.

Figure 9:
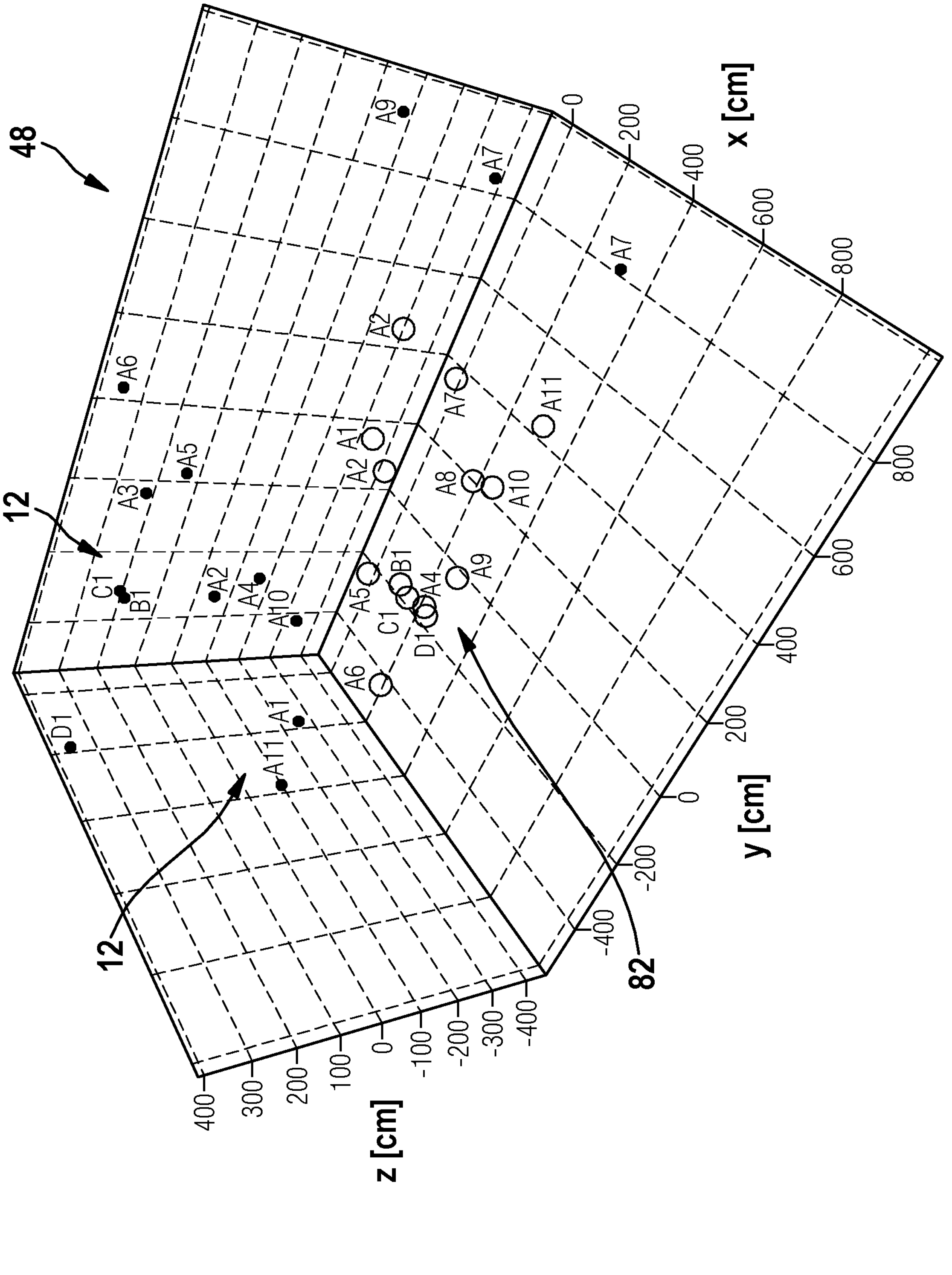
FIG. 9 is a schematic illustration comparing the HVAC system layout of FIG. 1 with an intermediate data model generated therefrom.

FIG. 9 illustrates an intermediate data model 82 with nodes (large circles) representing relative disposition of the automation devices 12 (small circles) of the HVAC system 10 as defined by the HVAC information plan 48. To assist in understanding, the nodes and the devices 12 are labelled, although it will be appreciated that in use the identity of each node would not normally be known at this stage of the process. The disposition of the nodes relative to one another is generally correct, but the intermediate data model 82 has a random orientation and mis-alignment with respect to the actual layout of the automation devices 12 and/or the HVAC information plan 48.

Figure 10:
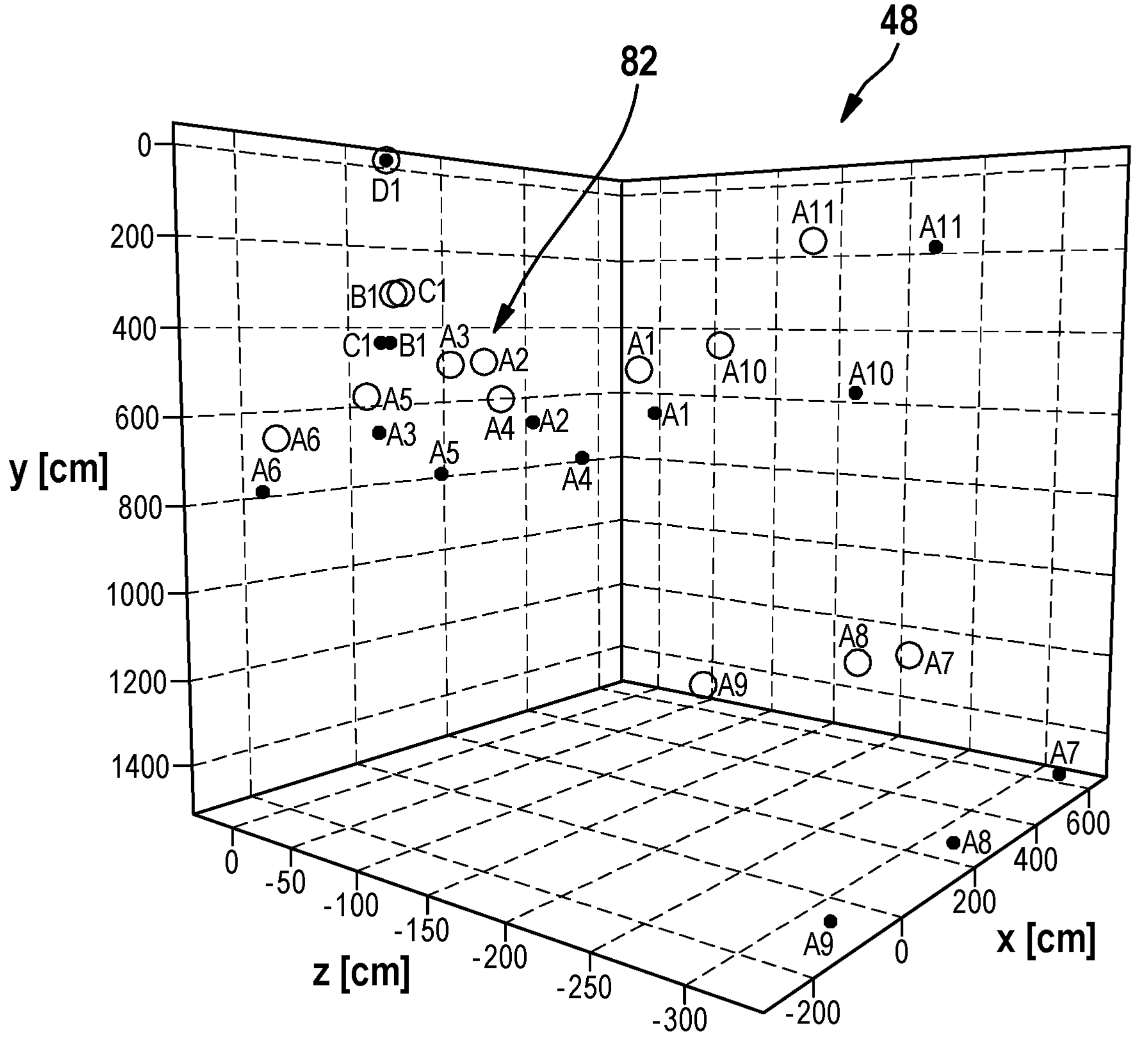
FIG. 10 is a schematic illustration of rotation of the intermediate data model, used in a process of pattern matching.

Referring to FIG. 6, step 90 serves to fit the intermediate data model 82 (or multiple models if, for example, a respective different model is generated per device type and/or multiple models are generated as different possible dispositions from the same separation distance data) to at least a portion of the HVAC information plan 48, using a pattern fitting algorithm. The pattern fitting algorithm of this embodiment is a non-landmark-matching algorithm. The pattern fitting algorithm may also be referred to as a "snap to fit" algorithm, fitting the intermediate data model 82 to the HVAC information plan 48 without changing the fundamental nature of the intermediate data model 82. Pattern fitting may comprise using a pattern matching algorithm and/or using a pattern recognition algorithm. The pattern fitting algorithm uses one or a plurality of any of the following:

(i) reorientation and/or rotation of the intermediate data model 82, about one or more axes, to a state that is closer to the HVAC information plan 48. The axes may be co-ordinate axes of the three dimensional space, or other arbitrary axes of the model. For example, FIG. 10 illustrates rotation of the intermediate data model 82, such that the pattern of the nodes (large circles) comes closer to the pattern of the HVAC information plan 48.

Figure 11:
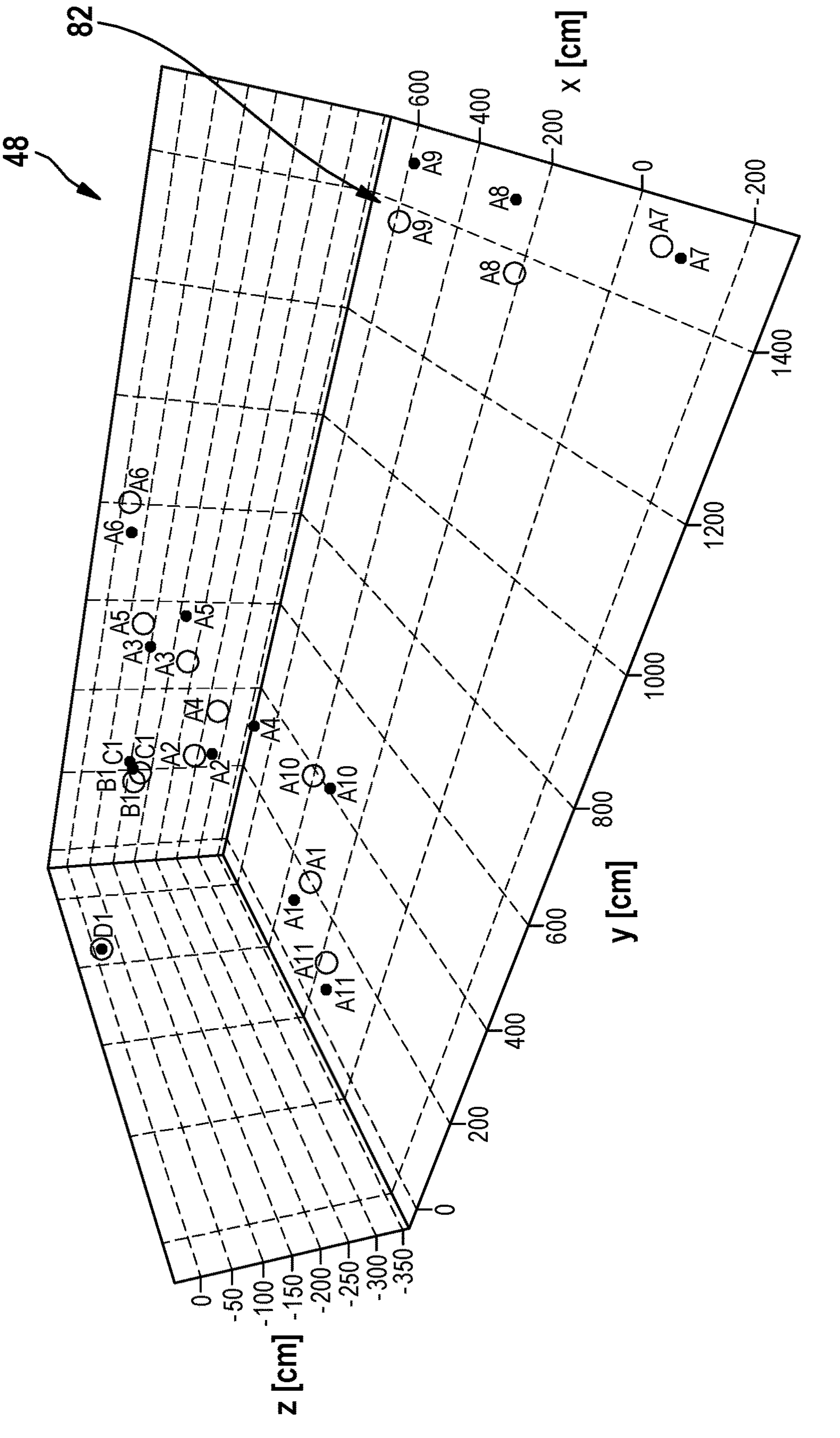
FIG. 11 is a schematic illustration of scaling the intermediate data model, used in a process of pattern matching.

(ii) reflection of the intermediate data model 82 with respect to a mirror plane;

(iii) re-scaling of the intermediate data model 82, unidirectionally and/or directionally. For example, FIG. 11 illustrates re-scaling of the intermediate data model 82, such that the pattern of the nodes (large circles) comes closer to the pattern of the HVAC information plan 48.

(iv) translation of the intermediate data model 82 to more closely match the HVAC information plan 48.

(v) adjustment of the position of one or more nodes. For example, it may be derivable from the HVAC information plan 48 whether certain distance measurements cross structures such as walls, or floors or other major obstacles. Such measurements may be less accurate compared to measurements made in line-of-sight. This can be accommodated in the intermediate data model 82, for example, adjusting a spring constant of interconnections that are not in line-of-sight, or by discarding measurements that are not in line-of-sight.

(vi) use of auxiliary information. The auxiliary data 68 and 70, and/or the device specific auxiliary information 72 and 74 may be compared with corresponding information in or derived from the HVAC information plan 48, for example, to resolve ambiguities, or provide additional degrees of refinement of pattern matching. For example, if some of the auxiliary data/information of the intermediate data model 82 matches uniquely a respective one of the automation devices in the HVAC information plan, this may be used to provide a starting point for pattern matching, without use of landmarks.

(vii) identification of automation devices that have a certain geometrical and/or geographic relation in the HVAC information plan, for example, arranged generally linearly with respect to one another along a conduit. Such a geometric relation can provide a focus for pattern matching.

(viii) treatment of closely grouped automation devices as a separate sub-group or separate constellation compared to other more distant automation devices. A separate sub-group can be processed, for example, rotated, scaled or translated at least partly independently of other automation devices, to focus fitting the sub-group to a respective part of the HVAC information plan.

Figure 12:
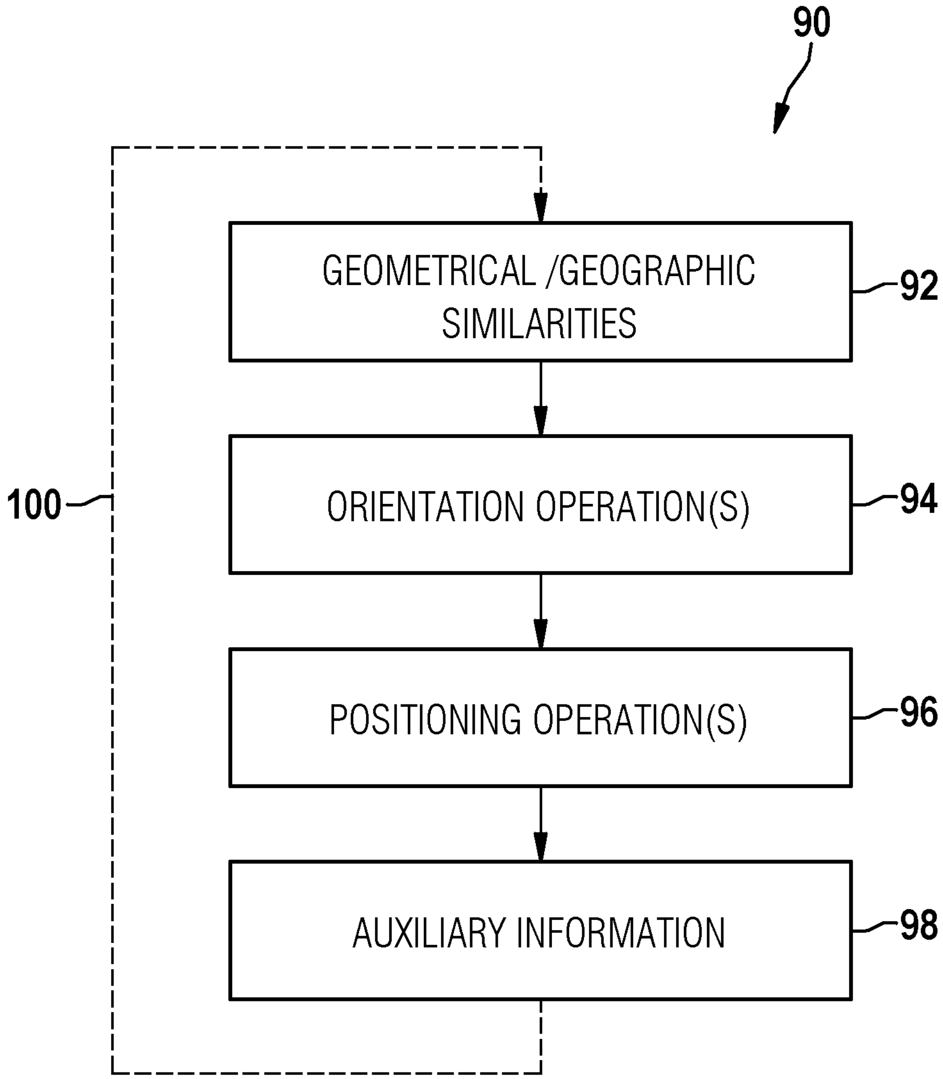
FIG. 12 is a schematic flow diagram illustrating an example pattern fitting algorithm.

Referring to FIG. 12, one example pattern fitting algorithm 90 is illustrated using the above techniques. Each step 92-96 described below may be performed for all automation device types together, and/or treating device types individually and/or in sub-sets. The steps may all be performed on the same type or types of automation device, or each individual step may optionally treat at least one different automation device type from a preceding step.

The example algorithm comprises a first step 92 of searching for one or more geometric and/or geographical similarities between the intermediate data model 82 and the HVAC information plan 48.

A second step 94 performs one or more orientation operations, for example rotating and/or reorientating and/or reflecting the intermediate data model 82 to reduce the degree of mis-match between the intermediate data model 82 and the HVAC information plan 48.

A third step 96 comprises one or more positioning operations, for example, re-scaling and/or translation and/or position adjustment.

A fourth step 98 optionally uses auxiliary information, for resolving ambiguities in pattern fitting.

As indicated by the arrow 100, the steps 92-98 may be repeated as appropriate, for example, to perform pattern fitting iteratively and/or to evaluate a fit using different parameters, for example, different device types and/or different ones of multiple intermediate data models. The order of the steps 92-98 may also be changed as desired.

Figure 13:
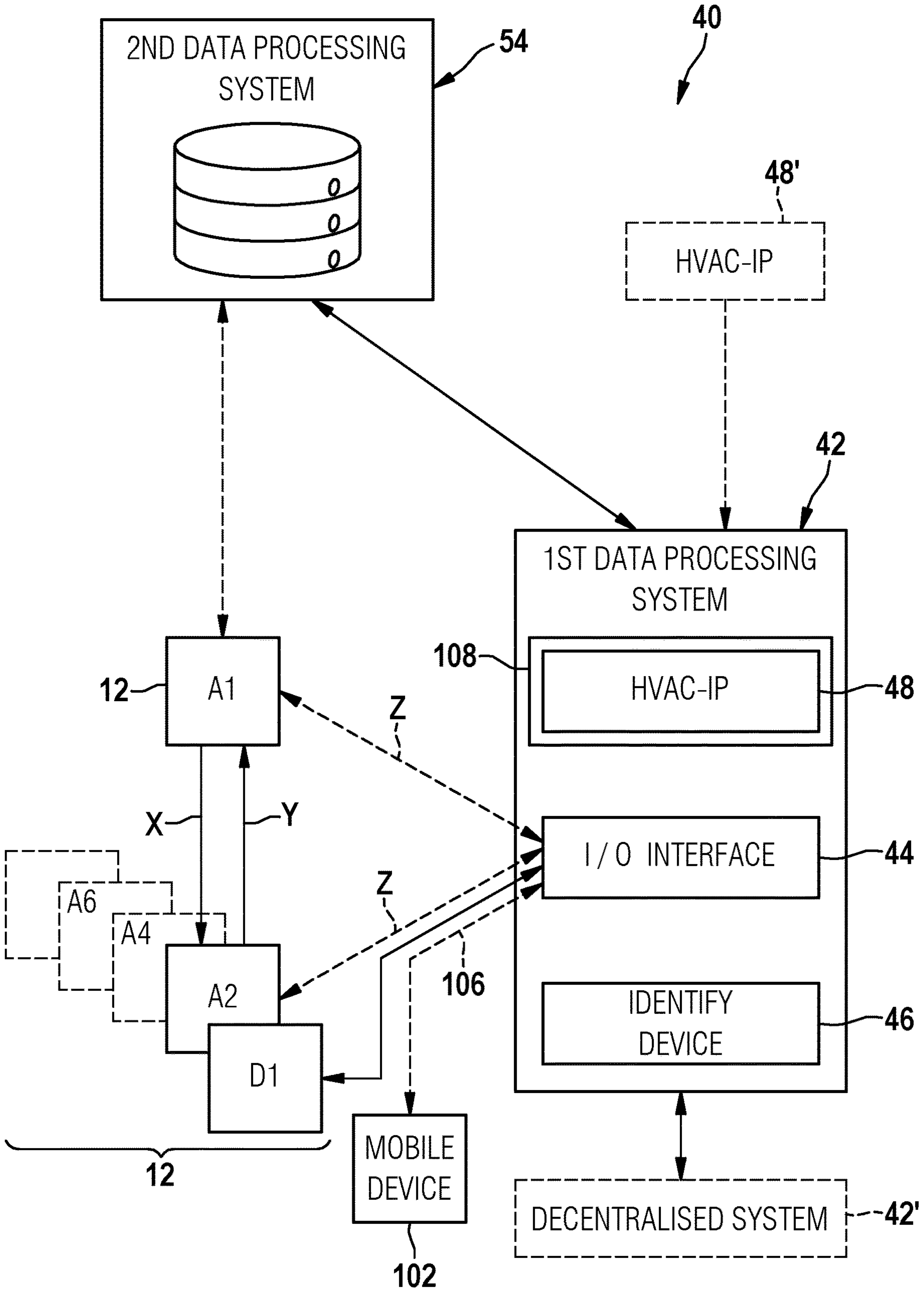
FIG. 13 is a schematic block diagram of an automated system for assisting commissioning of the HVAC system, wherein a mobile device is provided to assist with commissioning.
Figure 14:
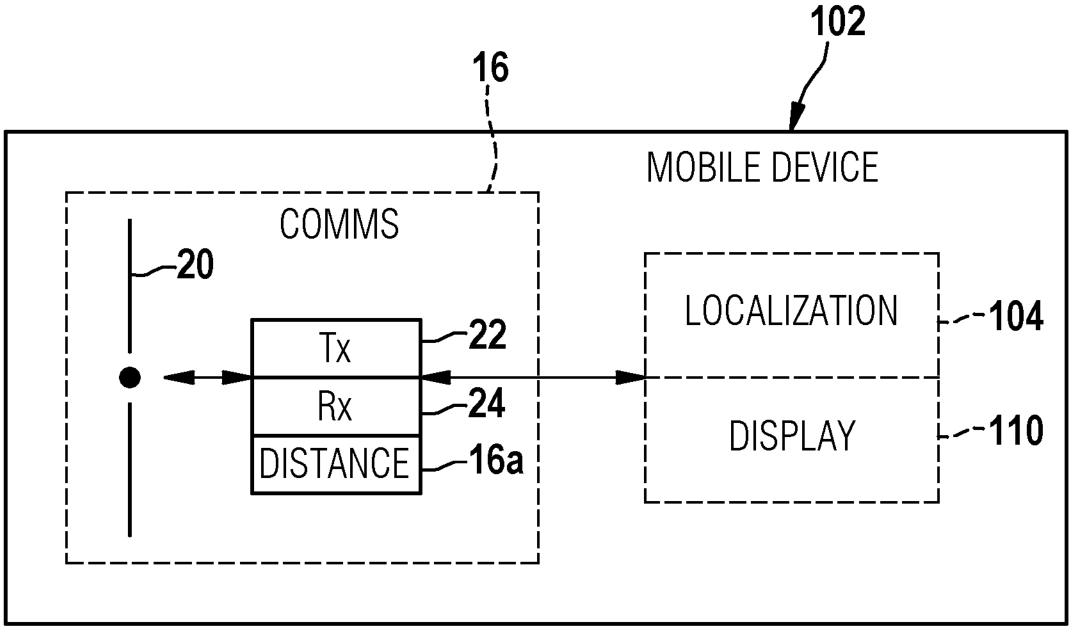
FIG. 14 is a schematic block diagram of functional parts of a mobile device.
Figure 15:
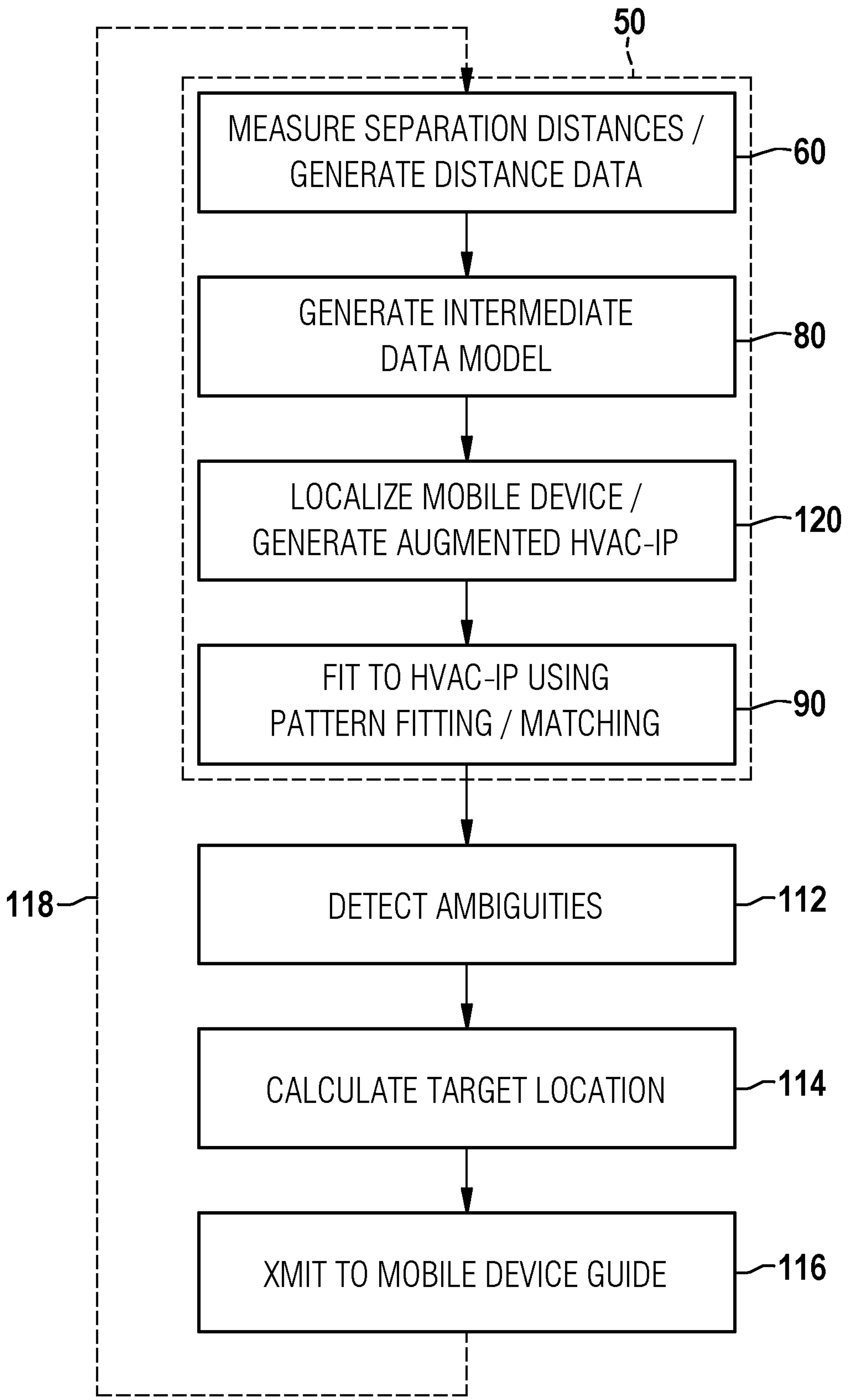
FIG. 15 is a schematic flow diagram illustrating a method of operation of the system of FIG. 13.

FIGS. 13-15 illustrate a second embodiment similar to the first embodiment, except that a mobile device 102 is additionally provided to assist with commissioning. The mobile device 102 may be a tool used by a commissioning expert during the commissioning process.

Referring to FIG. 14, the mobile device 102 is similar to an automation device 12, in that it includes a communications unit 16 compatible with the communications units of the automation devices 12. The mobile device 102 serves as a supplemental automation device, with distance measuring and/or ranging capabilities, and takes part in distance measuring to provide the separation distance data 62 (FIG. 7). The mobile device 102 further serves as a node in the intermediate data model 82, identified as a mobile device being a further distinct device type 72.

The mobile device 102 further comprises a localization module 104 able to localize the position of the mobile device 102 independently of the automation devices 12. The localization module 104 may use any suitable localization technology or technologies. Such localization technologies may be more complicated and/or more expensive than can be used in the HVAC automation devices 12 for economic reasons. The localized position determined by the module 104 is transmitted to the first data processing system 42, to provide further position awareness. The mobile device 102 communicates with the first processing system 42 via the same communication path as the automation devices 12 (for example, via the communications device D1, directly or via relay-hop communication) and/or via a dedicated antenna communication (indicated by the broken arrow 106).

The mobile device 102 does not form part of the HVAC system 10 with a fixed position, and is not included in the HVAC information plan 48. However, in this embodiment, the step 50 (FIG. 15) of detecting the position of an automation device 12 with respect to the HVAC information plan includes (in addition to the steps 60, 80 and 90 previously described) an additional step 120 of generating an augmented HVAC information plan 108 (FIG. 13) including the original HVAC information plan 48 and the localized position of the mobile device 102 as a further temporary device of the system. The step 120 of generating an augmented HVAC information plan is performed at least prior to the step 90 of fitting the intermediate data model 82 to the augmented HVAC information plan 108, and optionally prior to the step 80 or 60.

Provision of the mobile device 102 can provide an additional information point, with position awareness, in the intermediate data model 82 and the pattern fitting algorithm 90. The additional information point can assist in resolving ambiguity and/or providing a geometric and/or geographic characteristic to assist in pattern fitting.

Although the mobile device 102 is able to provide additional position information wherever it is used or located within the HVAC system 10, the method of FIG. 15 can optionally further provide guided instructions to the commissioning expert, for example, via a display screen 110 of the mobile unit, as to where the commissioning expert should position the mobile device 102 for best effectiveness. For example, having executed the position detection algorithm 50 a first time, step 112 determines whether ambiguities remain or exist in the pattern fitting step 90. Step 114 calculates a target location at which the mobile device 102 may subsequently be positioned to help resolve the ambiguities, and step 116 transmits the target location to the mobile device 102 for display to the commissioning expert. Multiple target locations may be generated and/or the method may be repeated iteratively, as indicated by arrow 118. The commissioning expert can be guided along a route of optimized target locations to complete position detection and commissioning efficiently and reliably, should fully automatic position detection be difficult to achieve for a particular HVAC system installation site. At each target location, the commissioning expert may manually indicate via the mobile device 102 that the mobile device is at the or a requested target location. Alternatively, the position of the mobile device 102 may be tracked in real time and the distance measuring between the automation devices 12 refreshed when the mobile device 102 is detected to have arrived at or close to a requested target location. It will further be appreciated that, unlike a fixed landmark device, the mobile device 102 need not be positioned physically precisely in order to provide positional awareness. Also, a single mobile device 102 can provide positional awareness at multiple locations (one at a time) reducing the resource burden compared to only fixed landmark devices. Although the advantage of a mobile device 102 and/or guided positioning has been illustrated in the context of a pattern fitting technique, it will be appreciated that a mobile device 102 may be used in other position determining techniques to provide additional position awareness.

In any of the embodiments, the HVAC system 10 may optionally be divided into certain zones, for example, according to different floors of a building, or different areas of an installation site. The technique of identifying (e.g. of generating the intermediate data model, and fitting to a portion of the HVAC information plan) may also be subdivided into groups of automation devices, for example, according to the zones. Sub-dividing can reduce computational load, and facilitate fitting to the HVAC information plan, provided that the sub-group provides a sufficient number of distance measurements for identification.

The techniques described above enable the position of the each automation device 12 to be found with respect to the HVAC information plan 48, and thus without relying on fixed landmark devices being added to the HVAC system 10. It will be appreciated that the foregoing description is merely illustrative of preferred embodiments, and does not limit the scope of the invention.

The invention claimed is:

1. A method of detecting positions of HVAC automation devices of an HVAC system with respect to an HVAC information plan representing at least partially the HVAC system, the method comprising:

determining, for each HVAC automation device of the HVAC automation devices, separation distances between the respective HVAC automation device and multiple other HVAC automation devices by measuring antenna transmission and reception distance, and generating separation distance data therefrom; and identifying, for each HVAC automation device, a position in the HVAC information plan by processing a pattern derived from the separation distance data.

2. The method of claim 1, wherein measuring the antenna transmission and reception distance comprises measuring at least one of ultrawideband transmission and reception, non-carrier-wave transmission and reception, transmission and reception with time of flight ranging, impulse-based transmission and reception, pulse-binary-shift-keying (PBSK) transmission and reception, pulse-binary-frequency-shift-keying (PBFSK) transmission and reception, or transmission and reception occupying a bandwidth of at least 500 MHz.

3. The method of claim 1, wherein measuring the antenna transmission and reception distance comprises measuring at least one of Bluetooth transmission and reception, transmission and reception in the 2.4 GHz spectrum, or frequency-hopping spread spectrum transmission and reception.

4. A method of detecting positions of HVAC automation devices of an HVAC system with respect to an HVAC information plan representing at least partially the HVAC system, the method comprising:

receiving, from the HVAC automation devices, separation distance data representing, for each HVAC automation device of the HVAC automation devices, separation distances between the respective HVAC automation device and multiple other HVAC automation devices of the HVAC system, the separation distance data based on measured antenna transmission and reception distance; and identifying, for each HVAC automation device, a position in the HVAC information plan by processing a pattern derived from the separation distance data.

5. The method of claim 4, wherein processing the pattern derived from the separation distance data comprises:

generating, from the separation distance data, an intermediate data model representing a disposition of the HVAC automation devices relative to one another; and fitting the intermediate data model to at least a portion of the HVAC information plan using a pattern fitting algorithm.

6. The method of claim 5, wherein the intermediate data model represents the disposition of the HVAC automation devices as nodes in an interconnected network, wherein relative lengths of interconnections between the nodes are based on the separation distances measured between the HVAC automation devices.

7. The method of claim 5, wherein fitting the intermediate data model to the at least portion of the HVAC information plan comprises at least one of reorienting the intermediate data model with respect to co-ordinate axes, reflecting the intermediate data model with respect to a mirror plane, rescaling the intermediate data model, translating the intermediate data model with respect to co-ordinate axes, or adjusting the separation distances.

8. The method of claim 4, wherein identifying the position in the HVAC information plan for each HVAC automation device comprises treating an HVAC automation device associated with a greater number of measurement distances with increased position accuracy relative to an HVAC automation device associated with fewer distance measurements.

9. The method of claim 4, wherein identifying the position in the HVAC information plan for each HVAC automation device comprises treating separation distance accuracy to be dependent on at least one of the degree to which the HVAC automation devices are in mutual line-of-sight, the degree to which the separation distance determinations are stable, or a respective confidence factor associated with a separation distance.

10. The method of claim 4, wherein identifying the position in the HVAC information plan for each HVAC automation device comprises comparing auxiliary information obtained from an HVAC automation device with corresponding information within or derivable from the HVAC information plan to identify the HVAC automation device.

11. The method of claim 10, wherein the auxiliary information comprises at least one of:

type information defining a type of the HVAC automation device, orientation information expressing a physical orientation of the HVAC automation device, orientation information expressing a directional orientation of the HVAC automation device, azimuth information associated with one or more separation distances, or elevation information expressing a relative elevation of the HVAC automation device.

12. The method of claim 4, wherein identifying the position in the HVAC information plan for each HVAC automation device comprises:

identifying a sub-set of the HVAC automation devices determined to be grouped together; and treating the sub-set of HVAC automation devices independently of other HVAC automation devices.

13. The method of claim 1, wherein:

determining a separation distance between an HVAC automation device and another HVAC automation device comprises measuring a separation distance at least one other time resulting in at least one other separation distance measurement; and generating separation distance data comprises processing the at least one other separation distance measurement.

14. The method of claim 13, wherein processing the at least one other separation distance measurement comprises at least one of:

calculating an average separation distance based on the at least one other separation distance measurement;

calculating a minimum separation distance based on the at least one other separation distance measurement; or calculating a characteristic representing a degree of variability based on the at least one other separation distance measurement.

15. The method of claim 1, further comprising:

identifying, using first data processing system, at least one HVAC automation device based on the position of the at least one HVAC automation device in the HVAC information plan; and loading operating information into the at least one HVAC automation device, based on the identity of the HVAC automation device, by:

using antenna communication;

accessing a second data processing system remote from and/or independent of the first data processing system; and obtaining at least some operating information from the second data processing system.

16. The method according to claim 15, wherein the at least some operating information comprise device-specific and/or application-specific operating information specific to the HVAC automation device.

17. The method of claim 1, wherein processing the pattern derived from the separation distance data comprises:

generating, from the separation distance data, an intermediate data model representing a disposition of the HVAC automation devices relative to one another; and fitting the intermediate data model to at least a portion of the HVAC information plan using a pattern fitting algorithm.

18. The method of claim 17, wherein the intermediate data model represents the disposition of the HVAC automation devices as nodes in an interconnected network, wherein relative lengths of interconnections between the nodes are based on the separation distances measured between the HVAC automation devices.

19. The method of claim 17, wherein fitting the intermediate data model to the at least portion of the HVAC information plan comprises at least one of reorienting the intermediate data model with respect to co-ordinate axes, reflecting the intermediate data model with respect to a mirror plane, rescaling the intermediate data model, translating the intermediate data model with respect to co-ordinate axes, or adjusting the separation distances.

20. A method of detecting positions of HVAC automation devices of an HVAC system with respect to an HVAC information plan representing at least partially the HVAC system, the method comprising:

determining, for each HVAC automation device of the HVAC automation devices, separation distances between the respective HVAC automation device and multiple other HVAC automation devices by measuring antenna transmission and reception distance, and generating separation distance data therefrom;

comparing auxiliary information obtained from an HVAC automation device with corresponding information within or derivable from the HVAC information plan to identify the HVAC automation device; and identifying, for each identified HVAC automation device, a position in the HVAC information plan based on the separation distance data.

21. The method of claim 20, wherein the auxiliary information comprises at least one of:

type information defining a type of the HVAC automation device, orientation information expressing a physical orientation of the HVAC automation device, orientation information expressing a directional orientation of the HVAC automation device, azimuth information associated with one or more separation distances, or elevation information expressing a relative elevation of the HVAC automation device.

22. A method of detecting positions of HVAC automation devices of an HVAC system with respect to an HVAC information plan representing at least partially the HVAC system, the method comprising:

receiving, from the HVAC automation devices, separation distance data representing, for each HVAC automation device of the HVAC automation devices, separation distances between the respective HVAC automation device and multiple other HVAC automation devices of the HVAC system, the separation distance data based on measured antenna transmission and reception distance;

comparing auxiliary information obtained from an HVAC automation device with corresponding information within or derivable from the HVAC information plan to identify the HVAC automation device; and identifying, for each identified HVAC automation device, a position in the HVAC information plan based on the separation distance data.

23. The method of claim 22, wherein the auxiliary information comprises at least one of:

type information defining a type of the HVAC automation device, orientation information expressing a physical orientation of the HVAC automation device, orientation information expressing a directional orientation of the HVAC automation device, azimuth information associated with one or more separation distances, or elevation information expressing a relative elevation of the HVAC automation device.

24. A method of detecting positions of HVAC automation devices of an HVAC system with respect to an HVAC information plan representing at least partially the HVAC system, the method comprising:

determining, for each HVAC automation device of the HVAC automation devices, separation distances between the respective HVAC automation device and multiple other HVAC automation devices by measuring antenna transmission and reception distance at two or more times, and generating separation distance data from two or more antenna transmission and reception distances; and identifying, for each HVAC automation device, a position in the HVAC information plan based on the separation distance data.

25. The method of claim 24, wherein generating the separation distance data from the two or more antenna transmission and reception distances comprises at least one of:

calculating an average separation distance based on the two or more antenna transmission and reception distances;

calculating a minimum separation distance based on the two or more antenna transmission and reception distances; or calculating a characteristic representing a degree of variability based on the two or more antenna transmission and reception distances.

26. A method of detecting positions of HVAC automation devices of an HVAC system with respect to an HVAC information plan representing at least partially the HVAC system, the method comprising:

determining, for each HVAC automation device of the HVAC automation devices, separation distances between the respective HVAC automation device and multiple other HVAC automation devices by measuring antenna transmission and reception distance, and generating separation distance data therefrom;

identifying, for each HVAC automation device, a position in the HVAC information plan based on the separation distance data;

identifying, using a first data processing system, at least one HVAC automation device based on the position of the at least one HVAC automation device in the HVAC information plan; and loading operating information into the at least one HVAC automation device, based on the identity of the HVAC automation device, by:

using antenna communication;

accessing a second data processing system remote from and/or independent of the first data processing system; and obtaining at least some operating information from the second data processing system.

27. The method according to claim 26, wherein the at least some operating information comprise device-specific and/or application-specific operating information specific to the HVAC automation device.

28. A method of detecting positions of HVAC automation devices of an HVAC system with respect to an HVAC information plan representing at least partially the HVAC system, the method comprising:

receiving, from the HVAC automation devices, separation distance data representing, for each HVAC automation device of the HVAC automation devices, separation distances between the respective HVAC automation device and multiple other HVAC automation devices of the HVAC system, the separation distance data based on measured antenna transmission and reception distance;

identifying, for each HVAC automation device, a position in the HVAC information plan based on the separation distance data;

identifying, using a first data processing system, at least one HVAC automation device based on the position of the at least one HVAC automation device in the HVAC information plan; and loading operating information into the at least one HVAC automation device, based on the identity of the HVAC automation device, by:

using antenna communication;

accessing a second data processing system remote from and/or independent of the first data processing system; and obtaining at least some operating information from the second data processing system.

29. The method according to claim 28, wherein the at least some operating information comprise device-specific and/or application-specific operating information specific to the HVAC automation device.

* * * * *